US009317423B2

(12) United States Patent
Tatara et al.

(10) Patent No.: US 9,317,423 B2
(45) Date of Patent: Apr. 19, 2016

(54) STORAGE SYSTEM WHICH REALIZES ASYNCHRONOUS REMOTE COPY USING CACHE MEMORY COMPOSED OF FLASH MEMORY, AND CONTROL METHOD THEREOF

(71) Applicant: HITACHI, LTD., Tokyo (JP)

(72) Inventors: Kohei Tatara, Yokohama (JP); Akira Yamamoto, Sagamihara (JP); Junji Ogawa, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 185 days.

(21) Appl. No.: 13/816,834

(22) PCT Filed: Jan. 7, 2013

(86) PCT No.: PCT/JP2013/000003
§ 371 (c)(1),
(2) Date: Feb. 13, 2013

(87) PCT Pub. No.: WO2014/106871
PCT Pub. Date: Jul. 10, 2014

(65) Prior Publication Data
US 2014/0195722 A1    Jul. 10, 2014

(51) Int. Cl.
*G06F 12/02*    (2006.01)
*G06F 12/08*    (2006.01)
(Continued)

(52) U.S. Cl.
CPC ............ *G06F 12/0246* (2013.01); *G06F 3/061* (2013.01); *G06F 3/065* (2013.01); *G06F 3/067* (2013.01); *G06F 11/2074* (2013.01); *G06F 12/0806* (2013.01)

(58) Field of Classification Search
CPC . G06F 11/20; G06F 11/2074; G06F 11/2058; G06F 12/0246; G06F 12/0806

USPC ................................ 707/613, 615, 648, 688, 707/999.201–999.204; 711/135, 118, 143, 711/E12.022, E12.037, E12.04
See application file for complete search history.

(56) References Cited

U.S. PATENT DOCUMENTS

| | | | | |
|---|---|---|---|---|
| 5,410,667 A | * | 4/1995 | Belsan | G06F 3/0601 707/999.202 |
| 5,619,696 A | * | 4/1997 | Nakagawa | G06F 9/4426 711/3 |
| 5,682,513 A | * | 10/1997 | Candelaria | G06F 11/2074 711/113 |

(Continued)

FOREIGN PATENT DOCUMENTS

EP        1 548 594 A1    6/2005

OTHER PUBLICATIONS

Buettcher, Stefan, Memory Management, CS350-Operating System, University of Waterloo, Fall 2006.*

*Primary Examiner* — Jared Rutz
*Assistant Examiner* — Khoa D Doan
(74) *Attorney, Agent, or Firm* — Mattingly & Malur, PC

(57) ABSTRACT

The first storage apparatus provides a primary logical volume, and the second storage apparatus has a secondary logical volume. When the first storage apparatus receives a write command to the primary logical volume, a package processor in a flash package allocates first physical area in the flash memory chip to first cache logical area for write data and stores the write data to the allocated first physical area. And when the package processor receives journal data creation command form the processor, allocates the first physical area to second journal area for journal data without storing journal data corresponding to the write data.

13 Claims, 19 Drawing Sheets

(51) Int. Cl.
*G06F 3/06* (2006.01)
*G06F 11/20* (2006.01)

(56) References Cited

U.S. PATENT DOCUMENTS

| | | | | |
|---|---|---|---|---|
| 5,875,487 | A * | 2/1999 | Schwartz | G06F 12/109 711/202 |
| 5,933,844 | A * | 8/1999 | Young | G06F 12/0891 711/135 |
| 6,282,610 | B1 * | 8/2001 | Bergsten | G06F 3/0619 707/999.202 |
| 6,360,231 | B1 * | 3/2002 | Pong | G06F 12/0815 |
| 6,360,306 | B1 * | 3/2002 | Bergsten | G06F 3/0619 707/999.202 |
| 6,587,921 | B2 * | 7/2003 | Chiu | G06F 12/0813 707/999.008 |
| 6,598,134 | B2 * | 7/2003 | Ofek | G06F 3/0607 709/217 |
| 7,051,174 | B2 * | 5/2006 | Ash | G06F 11/1666 707/999.202 |
| 7,062,628 | B2 * | 6/2006 | Amano | G06F 11/1458 707/999.202 |
| 7,152,079 | B2 | 12/2006 | Hirakawa et al. | |
| 7,216,209 | B2 * | 5/2007 | Kasako | G06F 11/2058 707/999.2 |
| 7,383,408 | B2 * | 6/2008 | Meiri | G06F 3/0614 700/82 |
| 7,418,565 | B2 * | 8/2008 | Takeda | G06F 11/2066 711/162 |
| 7,454,582 | B2 * | 11/2008 | Watanabe | G06F 11/2082 707/999.202 |
| 7,457,929 | B2 * | 11/2008 | Kasako | G06F 11/2058 707/999.2 |
| 7,590,809 | B2 * | 9/2009 | Ninose | G06F 11/2058 711/162 |
| 7,739,454 | B2 * | 6/2010 | Hoshino | G06F 12/084 711/129 |
| 9,075,534 | B2 * | 7/2015 | Satoyama | G06F 3/0608 |
| 2003/0074600 | A1 * | 4/2003 | Tamatsu | G06F 11/1458 714/5.11 |
| 2004/0153482 | A1 * | 8/2004 | Rowlands | G06F 12/0859 |
| 2004/0260735 | A1 * | 12/2004 | Martinez | G06F 3/0613 |
| 2005/0033804 | A1 * | 2/2005 | Iwami | G06F 3/0611 709/203 |
| 2005/0033827 | A1 * | 2/2005 | Yamagami | G06F 3/067 709/219 |
| 2005/0182890 | A1 * | 8/2005 | Yamagami | G06F 3/0605 711/4 |
| 2005/0273565 | A1 * | 12/2005 | Hirakawa | G06F 11/2058 711/162 |
| 2005/0278391 | A1 * | 12/2005 | Spear | G06F 11/2082 |
| 2006/0085609 | A1 * | 4/2006 | Ninose | G06F 11/2058 711/162 |
| 2007/0050574 | A1 * | 3/2007 | Kaiya | G06F 11/2058 711/162 |
| 2007/0168630 | A1 * | 7/2007 | Hirakawa | G06F 11/2074 711/162 |
| 2007/0271414 | A1 * | 11/2007 | Nakatani | G06F 11/2064 711/113 |
| 2008/0065853 | A1 * | 3/2008 | Yamagami | G06F 3/0605 711/170 |
| 2008/0071842 | A1 * | 3/2008 | Tokuda | G06F 11/1469 |
| 2008/0215835 | A1 * | 9/2008 | Hirakawa | G06F 11/2074 711/162 |
| 2008/0229038 | A1 * | 9/2008 | Kimura | G06F 11/2066 711/162 |
| 2009/0113149 | A1 * | 4/2009 | Kondo | G06F 11/2058 711/161 |
| 2009/0157974 | A1 * | 6/2009 | Lasser | G06F 12/0884 711/135 |
| 2009/0193207 | A1 * | 7/2009 | Ogata | G06F 3/0611 711/162 |
| 2010/0088280 | A1 * | 4/2010 | Satoyama | G06F 11/1471 707/640 |
| 2010/0199038 | A1 * | 8/2010 | Ito | G06F 11/2074 711/113 |
| 2010/0205362 | A1 * | 8/2010 | Lasser | G06F 12/0246 711/103 |
| 2010/0306448 | A1 * | 12/2010 | Chen | G06F 12/0804 711/103 |
| 2010/0325339 | A1 * | 12/2010 | Ogawa | G06F 3/061 711/103 |
| 2011/0093646 | A1 * | 4/2011 | Koka | G06F 12/0817 711/103 |
| 2011/0145473 | A1 * | 6/2011 | Maheshwari | G06F 12/0866 711/103 |
| 2011/0167223 | A1 | 7/2011 | Isono | |
| 2011/0251993 | A1 * | 10/2011 | Kondo | G06F 11/1456 707/613 |
| 2011/0251999 | A1 * | 10/2011 | Takahashi | G06F 11/2058 707/636 |
| 2012/0005430 | A1 | 1/2012 | Watanabe et al. | |
| 2012/0089779 | A1 * | 4/2012 | Suzuki | G06F 11/2058 711/114 |
| 2014/0317366 | A1 * | 10/2014 | Sakata | G06F 3/065 711/162 |

\* cited by examiner

Segment control block (SGCB) 801

| Item | Configuration value |
|---|---|
| SEG# | 10 |
| VOL address | VOL#: 1, LBA#: 0x100 |
| Cache status | Clean / Dirty |
| Dirty bit map | 0x0000000000000000 |

|  5111 | 5112 |
|---|---|
| Logical address | Physical address |
| 0x4000 (For write data) | 0x4000 |
| 0x100000 (For JNCB) | 0x0000 |
| 0x114000 (For JNL data) | 0x4000 |
| ... | ... |

| Pair # | DKC#(A) | PVOL# | DKC#(B) | SVOL# | Copied address |
|---|---|---|---|---|---|
| 1 | 1 | 1 | 2 | 1 | 0 |
| 2 | 3 | 2 | 4 | 3 | 0 |
| 3 | 3 | 3 | 4 | 4 | 0 |
| 4 | ... | ... | ... | ... | ... |
| 5 | ... | ... | ... | ... | ... |
| 6 | ... | ... | ... | ... | ... |

| Group # | Pair group | JVOL# | Latest SEQ # | Forwarded SEQ # | Reflected SEQ # |
|---|---|---|---|---|---|
| 1 | 1 | 4 | 4 | 3 | 2 |
| 2 | 2,3 | 5 | 10 | 8 | 6 |

Reference labels: 3271, 3272, 3273, 3274, 3275, 3276

427

| Group # | Pair group | JVOL# | Latest SEQ # | Received SEQ # | Reflected SEQ # |
|---|---|---|---|---|---|
| 1 | 1 | 5 | 4 | 3 | 2 |
| 2 | 2,3 | 6 | 10 | 8 | 6 |

Reference labels: 4271, 4272, 4273, 4274, 4275, 4276

Fig. 14

| Item | Logical address | |
|---|---|---|
| | VOL# | Position from head of VOL storage area (LBA) |
| 3281 JNCB area head address | 4 | 0 |
| 3282 Write data area head address | 4 | 700 |
| 3283 JNCB latest address | 4 | 500 |
| 3284 JNCB oldest address | 4 | 200 |
| 3285 Write data latest address | 4 | 2200 |
| 3286 Write data area head address | 4 | 1300 |
| 3287 Read start address | 4 | 400 |
| 3288 Retry start address | 4 | 300 |

| Configuration item | Configuration value example |
|---|---|
| Write command receiving time | 2012/08/14 22:20:10 |
| Group # | 1 |
| SEQ# | 4 |
| Write command logical address | VOL#: 1<br>Position from VOL head (LBA): 700 |
| Data size of write data | 300 |
| Logical address of JVOL which stores write data | VOL#: 4<br>Position from VOL head (LBA): 1500 |

901

STORAGE SYSTEM WHICH REALIZES ASYNCHRONOUS REMOTE COPY USING CACHE MEMORY COMPOSED OF FLASH MEMORY, AND CONTROL METHOD THEREOF

TECHNICAL FIELD

The present invention relates to a storage apparatus, more specifically relates to an asynchronous remote copy function provided by the storage apparatus.

BACKGROUND ART

In recent years, high performance of a data copy function used for a backup of data with an increase in the amount of data written in a storage system from a server is needed.

CITATION LIST

Patent Literature

[PTL 1]
U.S. Pat. No. 7,152,079

PTL 1 discloses a control system for asynchronous remote copying which uses a journal. Specifically, a first storage system in a remote copy configuration stores write data received from a host and update information in a cache memory (hereinafter, CM). Then, the first storage system stores the write data in a primary logical volume (hereinafter, PVOL), and stores a copy (journal data) of the write data and update information in a journal volume (hereinafter, JVOL). Here, the update information includes an address number of a write command destination at the time of updating and a sequence number (hereinafter, SEQ#) which shows the update order of data. Furthermore, with a write process, asynchronously, a second storage system acquires the journal data and the update information from the first storage system, and stores the journal data and update information in a JVOL. And the second storage system reflects the journal data in the secondary logical volume (hereinafter, SVOL) according to the SEQ# in the update information.

SUMMARY OF INVENTION

Technical Problem

According to PTL 1, the first storage system uses the CM which includes DRAM. The CM rewrites the old data to update data, when the update data is written therein. Therefore, the first storage system is needed to do management so that the journal data which has not been sent to the second storage system is not erased by the update write process.

Therefore, in PTL 1, a processor in the first storage system evacuates the old data on the CM to another area on the CM when receiving the update write command. Then, the processor stores the update data in the CM by overwriting the old data. Furthermore, the processor stores the update information called journal control block (hereinafter, JNCB) of the update data on the CM.

Furthermore, as another method, there is a method that, when the processor in the first storage system receives a write command, it writes data in the CM, further, it stores the copy (journal data) and JNCB of the data in another area on CM, and after that, notifies the write process completion to the host.

In these methods, there is a problem that, when the first storage system uses the CM which includes DRAM, it is necessary for the processor in the first storage system to perform either a process which evacuates the old data to another area on the CM in case the processor has received the update data, or a process to store the journal data on the CM which is the data or the data copy at the time of receiving data, and the load increase of the processor is caused.

Solution to Problem

One aspect of the present invention is a storage system comprising, a first storage apparatus including a first processor, a first memory device providing storage area for a primary logical volume, and a first flash package which has a plurality of first flash memory chips and a first package processor and temporarily stores data to be wrote to the primary logical volume, and a second storage apparatus including a second processor, and a second memory device providing storage are for a secondary logical volume, and receiving journal data corresponding to write data to the primary logical volume and update information, and reflecting the journal data to the secondary logical volume according to the update information, wherein when the first storage apparatus receives a write command which requests to write a first write data to the primary volume, the first package processor in the flash package receives the first write data transferred by control of the first processor, allocates first physical area in the first flash memory chips to first cache logical area for write data managed by the first flash package, and writes the first write data to the allocated first physical area, the first package processor in the flash package receives first journal data creation request corresponding to the first write data from first processor, and allocates the first physical area which stores the first write data to second cache logical area for journal data managed by the first flash package.

Another aspect of the present invention is a control method for a storage apparatus including a processor, a plurality of memory devices, and cache package having a plurality of flash memory chips and a package processor, the control method comprising: providing a primary logical volume provided by the plurality of memory devices; receiving a write command which requests to write a write data to the primary logical volume; allocating, by the package processor, first physical area in the flash memory chips to first cache logical area for write data managed by the cache package, and storing the write data to the allocated first physical area; sending, by the processor, a creation command of journal data corresponding to the write data to the cache package; allocating, by the package processor, the first physical area, in which the write data is stored, to second cache logical area for journal data managed by the cache package; and sending the journal data to another storage apparatus.

Effect of Invention

According to the present invention, when an asynchronous remote copy is provided, the load of the processor in the storage apparatus can be decreased.

BRIEF DESCRIPTION OF DRAWINGS

FIG. 12 is a diagram for showing the logical/physical translation table in the embodiment.

FIG. 13 is a diagram for showing a remote copy pair management table in the embodiment.

FIG. 14 is a diagram for showing a group management table in the embodiment.

FIG. 15 is a diagram for showing a JVOL management table in the embodiment.

DESCRIPTION OF EMBODIMENTS

Hereafter, an embodiment is described in detail using the drawings.

A storage apparatus (written herein as "DKC" for convenience) A DKC 101, includes at least, a processor 123 and a cache memory (hereinafter, CM) (it is also called a flash package) 128 which is composed of a flash memory (hereinafter, FM). Moreover, a flash package (hereinafter, FMPK) 128 has a package processor 501.

Here, the FM has a characteristic that, when it rewrites data, it cannot write update data over a physical area in which old data has been stored.

For this reason, the package processor 501 of the FMPK 128 does not write the update data over the physical area where the old data is stored, but writes the update data in another physical area when rewriting data. That is, the FM is recordable. Accordingly, unless an erase process of data is performed, even the updating target old data continues to be kept on the physical area of the FM, without being overwritten.

Figure 1:
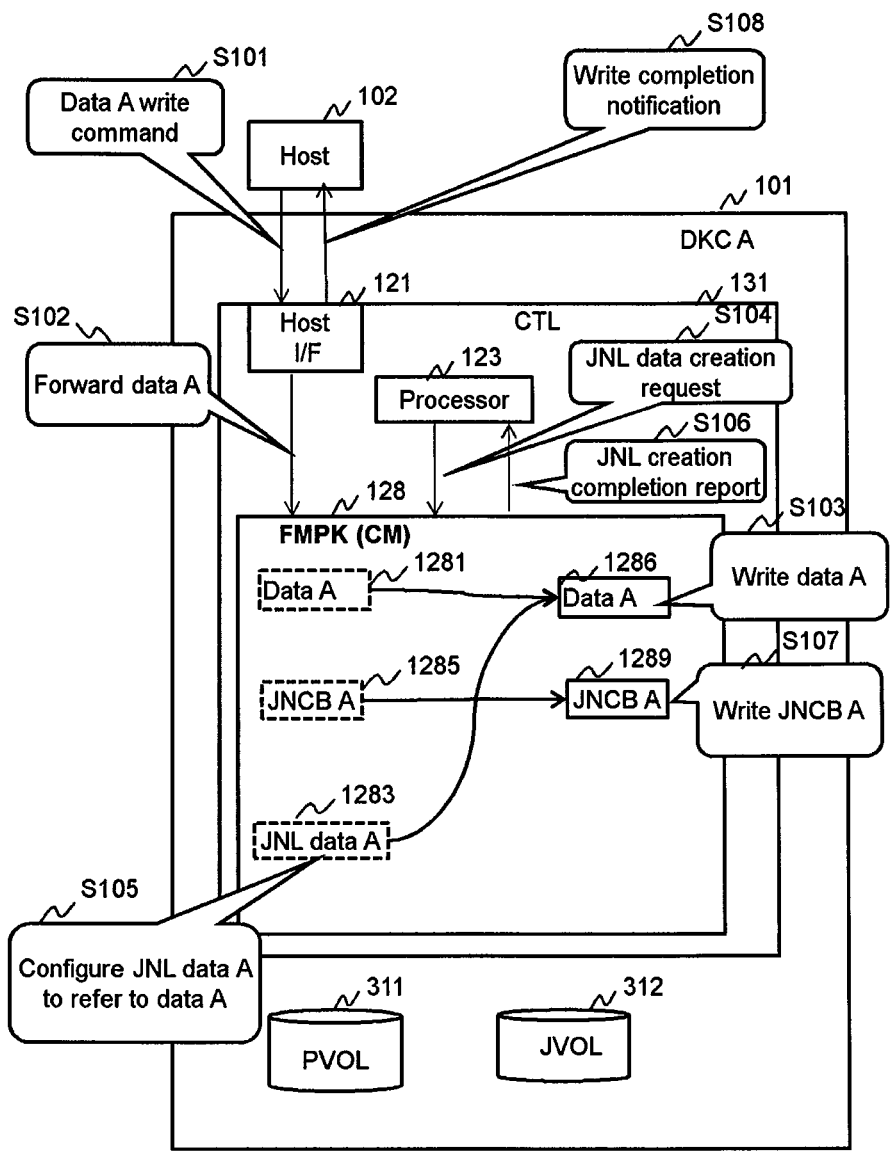
FIG. 1 is a diagram for showing the outline of a process at the time of receiving write data of a storage apparatus (hereinafter, DKC) A in an embodiment.
Figure 2:
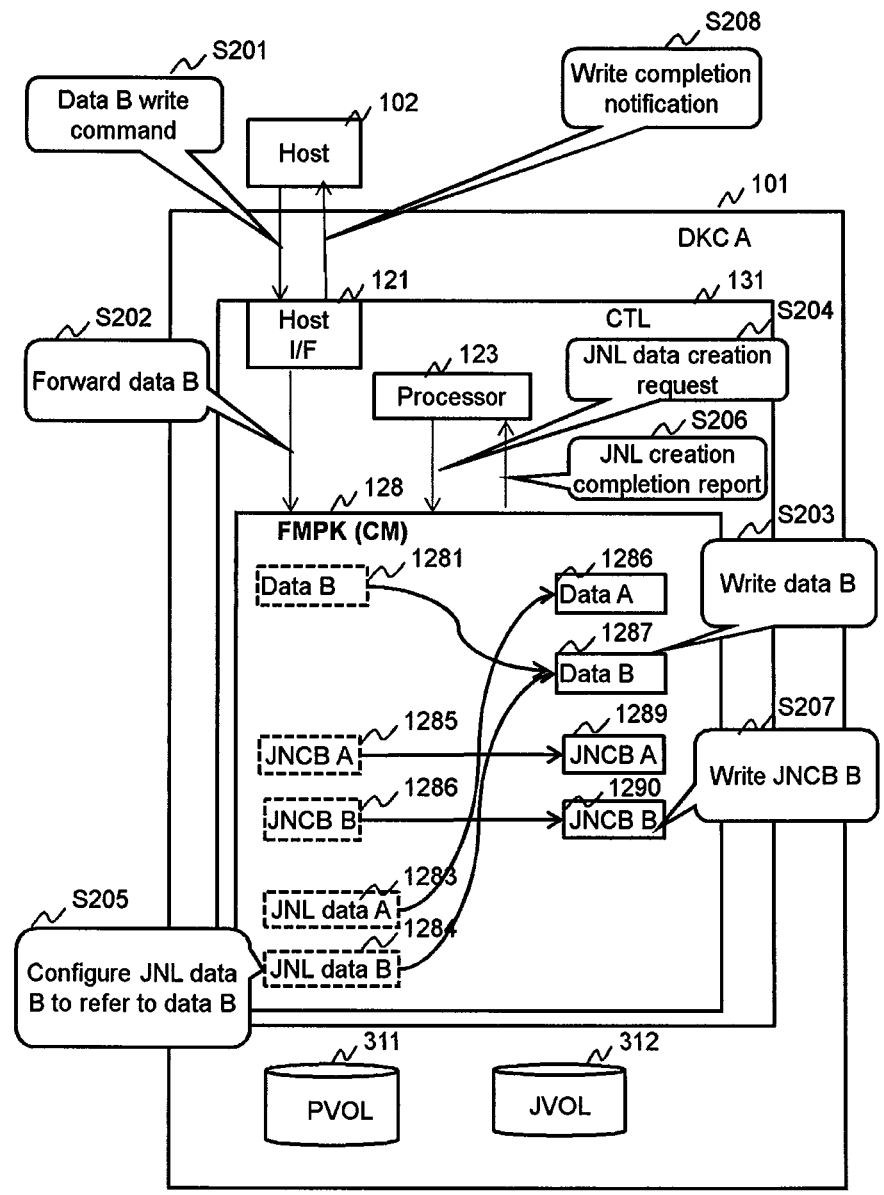
FIG. 2 is a diagram for showing the outline of the process at the time of receiving the write data of the DKC A in the embodiment.
Figure 3:
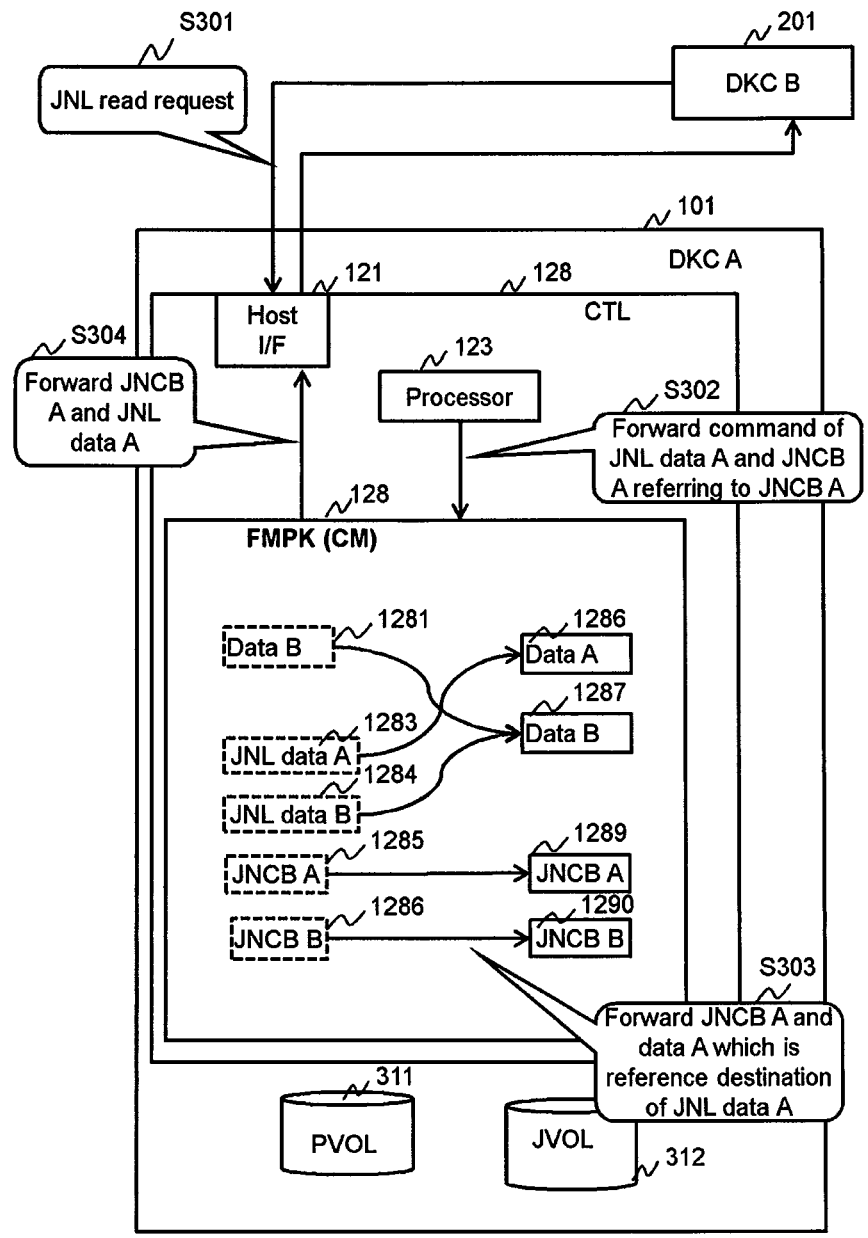
FIG. 3 is a diagram for showing the outline of process when the DKC A in the embodiment receives a JNL read request from the DKC B.

Hereafter, the outline of the embodiment is explained using FIG. 1 to FIG. 3.

<Process Procedure at the Time of Receiving Write Data in the Embodiment>

FIG. 1 is a diagram for showing the outline of the process at the time of receiving write data of the DKC A 101 in the embodiment.

When the write command of the data A is received from the host (S101), the host interface (I/F) 121 of the DKC A 101 forwards the write data (data A in FIG. 1) to the FMPK 128 which is the CM composed of the FM (S102). In addition, in FIG. 1, the left half of the FMPK 128 shows the logical area of the FMPK, and the right half of the FMPK 128 shows the physical area of the FMPK 128. The package processor 501 in the FMPK 128 secures a logical area (1281) for the PVOL 311 (or for write data) on the FM, assigns a physical area (1286) to the secured logical area (1281), and stores the write data A in the assigned physical area (1286) (S103). And then the processor 123 detects completion of storing the write data A in the FMPK 128, for example, by receiving notification which notifies completion to store the write data A in the FMPK 128.

Moreover, when the package processor 501 receives a journal (JNL) data creation request from the processor 123 (S104), the package processor 501 secures a logical area for the JNL data A (1283) in the FMPK, configures to refer to the physical area (1286) in which the write data A on the FM is stored (S105) about the secured logical area (1283) and issues a completion notification to the processor 123 (S106). Furthermore, the processor 123 creates a journal control block (JNCB) which is update information of the JNL. And the package processor 501 assigns a physical area (1289) to a logical area for the JNCB A on the FM (1285), and controls to store the JNCB A in the assigned physical area (1289) (S107). Then, the processor 123 of the DKC A 101 performs a response completion report to the host 102 (S108). In addition, the timing to store the JNCB (update) with the instructions of the processor 123 may be until the time the processor 123 of the DKC A 101 performs the response completion report to the host. Moreover, the package processor 501 may perform storing of the write data and the process of the JNL data creation request in parallel.

FIG. 2 is a diagram for showing the operation at the time of receiving the write command of the data B which is the renewal data of the data A, after receiving the write command of the data A from the host.

When the write command of the data B is received from the host (S201), the host interface (I/F) 121 of the DKC A 101 forwards the write data (data B in FIG. 2) to the FMPK 128 which is the CM composed of the FM (S202). The package processor 501 in the FMPK 128 assigns a physical area (1287) to a logical area (1281) for the PVOL 311 (or for write data) on the FM, and stores the write data B in the assigned physical area (1287) (S203). Here, the package processor 501 in the FMPK 128 releases the assignment of the physical area (1286) to the logical area for storing the old data A (1281), assigning the logical area for the JNL data A (1283) to the physical area (1286).

Since the process of S204-S208 is the same as the above-mentioned process of S104-108, the explanation of S204-S208 is omitted.

In addition, JNL data is the write data which is sent to the DKC B 201 from the DKC A 101 asynchronously with the write request, and can be put in another way as copy data, additional data, log data, update data, etc. Moreover, the JNCB is management information which does the management when and where (in what kind of order) the write of the JNL data was carried out, and is sent to the DKC B 201 from the DKC A 101 with the JNL data, and can be put in another way as JNL control information, JNL management information, meta data, update information, etc.

Conventionally, in the CM composed of Dynamic Random Access Memory (hereinafter, DRAM), there is a possibility that the old data may be overwritten by the update data. For this reason, the CM has had to perform the process of either to evacuate the old data to another area on the CM when receiving the update data or, to store the JNL data on the CM which is data or a copy of data at the time of receiving data, and the load increase of the processor 123 has caused. Since the FM which composes the CM 128 has the above-mentioned feature, the DKC A 101 of the embodiment treats the write data as JNL data and does not have to write JNL data by configuring the logical area for the JNL data to refer to the physical area which stores the write data in the FM, so it is effective to reduce the load of the processor 123 of the DKC A 101.

Moreover, in order to reduce the load of the processor 123 at the time of the write process of the DKC A 101 of the embodiment, it is effective to improve the response performance to the host for the write request.

Moreover, FM is cheap compared with DRAM. For this reason, the FMPK 128 which is the CM composed of FM can have a mass storage area compared with the CM composed of DRAM. Therefore, the DKC A 101 of the embodiment does not need to be equipped with a JNL logical volume (hereinafter, JVOL) 312 which is a logical volume in which the JNL is stored, and it is effective to lessen the storage capacity consumed in the storage apparatus.

In addition, the DKC A 101 of the embodiment prepares the JVOL 312 in advance, and when the storage capacity in the mass FMPK is run out, it may store the JNL data and update in the JVOL 312. However, the storage capacity can be made smaller than the conventional JVOL 312.

<Process Procedure at the Time of the Read Request of JNL Data in the Embodiment>

FIG. 3 is a diagram for showing the outline of the process when the DKC A 101 in the embodiment receives a JNL read request from the DKC B 201.

When a read command of the JNL (JNL read request) from the DKC B 201 of the remote copy destination is received (S201), the processor 123 of the DKC A 101 acquires JNCB A from the FMPK 128. Here, the JNCB A is update information about JNL data which has not been forwarded to the DKC B 201 yet. And the processor 123 requires FMPK 128 to forward the JNL data A and JNCB A with reference to the acquired JNCB A (S302). However, here, the logical area (1283) for the JNL data A refers to the physical area (1286) which stores the data A on the FM as mentioned above. The package processor 501 which has received the request forwards the JNL data A and JNCB A to the host IF 121 (S203, 204). And the host IF 121 forwards the JNL data A and JNCB A to the DKC B 201, and ends the process.

By using the FM as a storage medium, even after the write of the data B which is the update data for the data A is written, the FMPK can hold the data A. Moreover, by managing this data A as JNL data A, the FMPK can read the data A and forward it as JNL data even after the update by the data B.

The above is the explanation of the outline of the embodiment. The detailed portion of the embodiment is explained below. In addition, the present invention is not restricted to the embodiment, and all the applications corresponding to the thought of the present invention are included in the technical scope of the present invention. Moreover, unless limited in particular, each component can be plural or singular.

In the embodiment, a CM which uses a FM as a storage medium is explained as an example. However, the storage medium should be a recordable nonvolatile semiconductor memory, and may be for example, MRAM (Magnetic Random Access Memory: magnetic resistance memory), PRAM (Phase Change Random Access Memory: phase change memory), ReRAM (Resistance Random Access Memory: resistance change memory), etc.

In addition, in the following explanation, although the expression of "management table" etc, may explain a variety of information, the variety of information may be expressed by data structure other than table. Moreover, "management table" can be called "management information" in order to show that it is not dependent on data structure.

Moreover, although the following explanation may explain a process by making "program" as a subject, by being performed by the processor, the program performs the defined process, using storage resources (for example, memory) and communication interface apparatuses (for example, communication port) suitably, so the subject of the process may be the program. In addition, the processor may have an specialized hardware other than a CPU (Central Processor Unit). A program may be installed in each computer from the program sauce. The program source may be a program distribution server or a storage media, for example.

<Configuration of Storage System>

Figure 4:
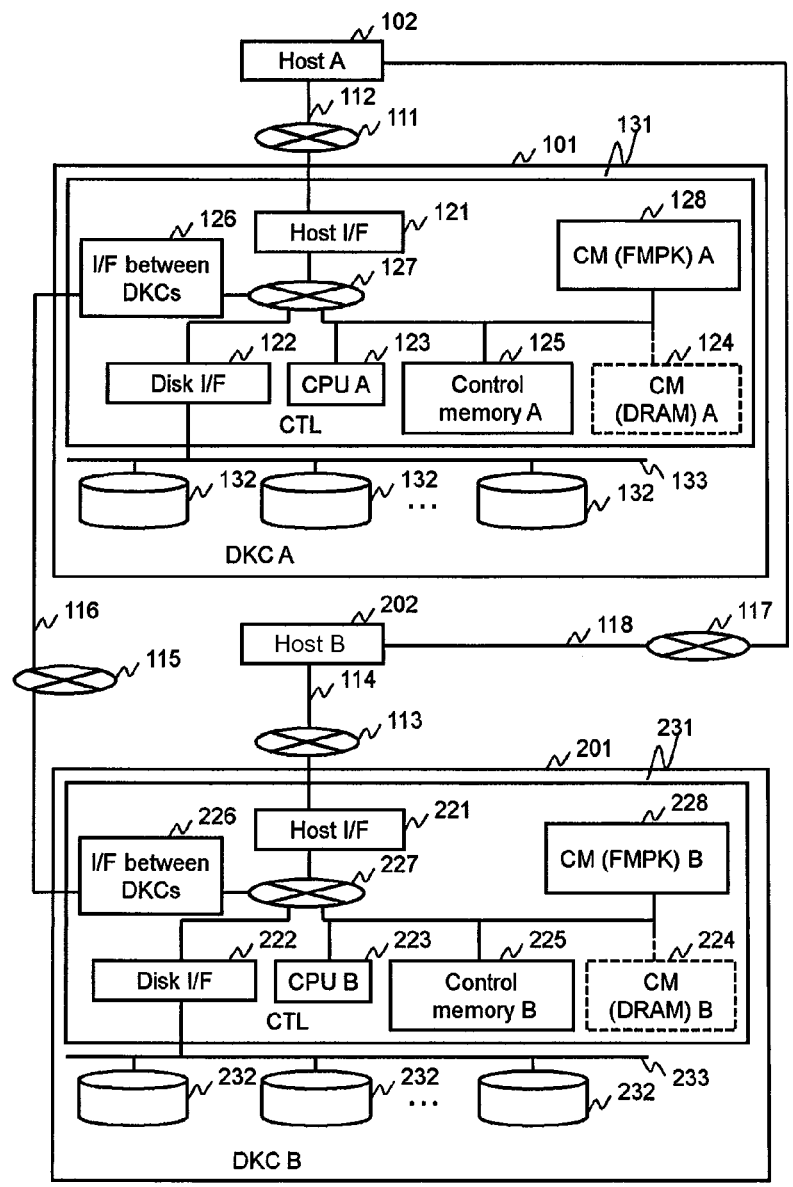
FIG. 4 is a diagram for showing a configuration of the storage system in the embodiment.

FIG. 4 is a diagram for showing the configuration of the storage system in the embodiment.

The storage system in the embodiment includes the DKC A 101 which is the primary side of the asynchronous remote copy configuration and the DKC B 201 which is the secondary side of the asynchronous remote copy configuration. The DKC A 101 is accessed by the host computer A 102 and the DKC B 201 is accessed by the host computer B 202. In addition, there may by plural DKC A 101s and DKC B 201s, respectively.

The DKC A 101 is coupled to the host computer A 102 for example, through the network 111. The DKC B 201 is coupled to the host computer B 202, for example, through the network 113. The DKC A 101 is coupled to the DKC B 201, for example, through the network 115. The host computer A 102 is coupled to the host computer B 202, for example, through the network 117. The networks 111, 113, 115, and 117 are communication networks, for example, and are SAN (Storage Area Network) or LAN (Local Area Network). Moreover, the communication lines 112, 114, 116, and 118 for each device to couple with a network for example, may be composed as cables, such as a metal cable and a fiber optic cable, and may be used combining plural cables, and a common cable may be used for them. In addition, in the embodiment, although coupled through the network of a cable, each device is not limited to this but may be coupled through the network of a radio.

Next, the DKC A 101 in the embodiment is explained.

The DKC A 101 in the embodiment has a storage controller (hereinafter, written as "CTL") 131 and a storage device 132.

The storage device 132, for example, are SSD (Solid State Drive), SAS (Serial Attached SCSI)-HDD (Hard Disk Drive), SATA (Serial Advanced Technology Attachment)-HDD, etc. In addition, the storage device 132 may be a device which stores data and is limited to neither SSD nor HDD. The storage device 132, for example, is coupled to the CTL 131 through the communication path 133 of a fiber channel cable, etc. In addition, plural storage devices 132 can compose one or more RAID (Redundant Array of Independent Disks) groups.

According to the command received from the host computer A 102, the CTL 131 controls input-and-output process of data for the storage device 132, that is, write (write) and read (read) of input-and-output process of data to the storage device 132. The CTL 131 provides a logical device as a logical volume (hereinafter, VOL) of an access target to the host computer A 102 which is an access request source. Under the circumstances, the CTL 131 can refer to the real storage area on the storage device 132, for example, by Logical Block Address (hereinafter, LBA), or can identify it.

The CTL 131 has, for example, a storage resource, a communication interface device (interface device is hereafter written as "I/F"), and an operation device coupled to them.

Storage resource includes CM (Cache Memory) A 128 (FMPK 128) composed of FM, and CM A 124 which are composed of DRAM (Dynamic Random Access Memory) and control memory A 125. The CM A 128 is a CM including a FM chip which is able to hold data without power supply (non-volatile), and is referred to also as FMPK in the embodiment. The CM A 124 is, for example, a CM including a DRAM which is losing data (volatile) which is held if there is no power supply. In addition, although the DKC A 101 of the embodiment includes the CM A 128 composed of FM and the CM A 124 composed of DRAM, DKC A 101 may include only the CM A 128 composed of FM among the CM A 124 and the CM A 128.

The operation device (processor) is CPU A 123, for example. The CPU 123 performs the microprogram mentioned later. The CPU 123 performs processes on the storage system, for example, a write process, a read process, an internal copy process, a remote copy process, etc.

The communication I/F has the host I/F 121 which receives a read command and a write command from the host, the disk I/F 122 which receives and sends data between a disk, and the I/F 126 between DKCs which receives and sends data between DKCs. The host I/F 121 is coupled to the host computer A 102 through the network 111. The host I/F 121 receives an access command (a write command or a read command) as an access request from each host computer 102. The disk I/F 122 is coupled to the storage device 132 through the communication paths 133, respectively, and performs receiving and sending of data between the memory disk 132 and storage resource (according to the embodiment, they are CM 124, CM 128 and control memory 125). The I/F 126 between DKCs receives a JNL read request mentioned later from the DKC B 201, or sends JNL data and JNCB to the DKC B.

In addition, these CM A 124, CM A 128, CPU A 123, host I/F 121, disk I/F 122, and I/F 126 between DKCs are mutually coupled through the network 127 which takes charge of communication lines, such as a bus, and a communication switch.

Next, the host computer A 102 in the embodiment is explained. The host computer A 102 is a general server, etc, and has a communication I/F, a storage resource and an operation device coupled to them. As for communication I/F, for example, it is a host bus adapter (HBA) for performing communication through the network 111.

The above is the explanation about the hardware configuration of the DKC A 101 which is the primary side of the asynchronous remote copy configuration, and the host computer A 102.

Moreover, the DKC B 201 which is the secondary side of the asynchronous remote copy configuration is the same hardware configuration as the DKC A 101. The host computer B 202 which is the secondary side of the asynchronous remote copy configuration is the same configuration as the host computer A 102.

<Logical Configuration of DKC A which is the Primary Side of the Remote Copy Configuration>

Figure 5:
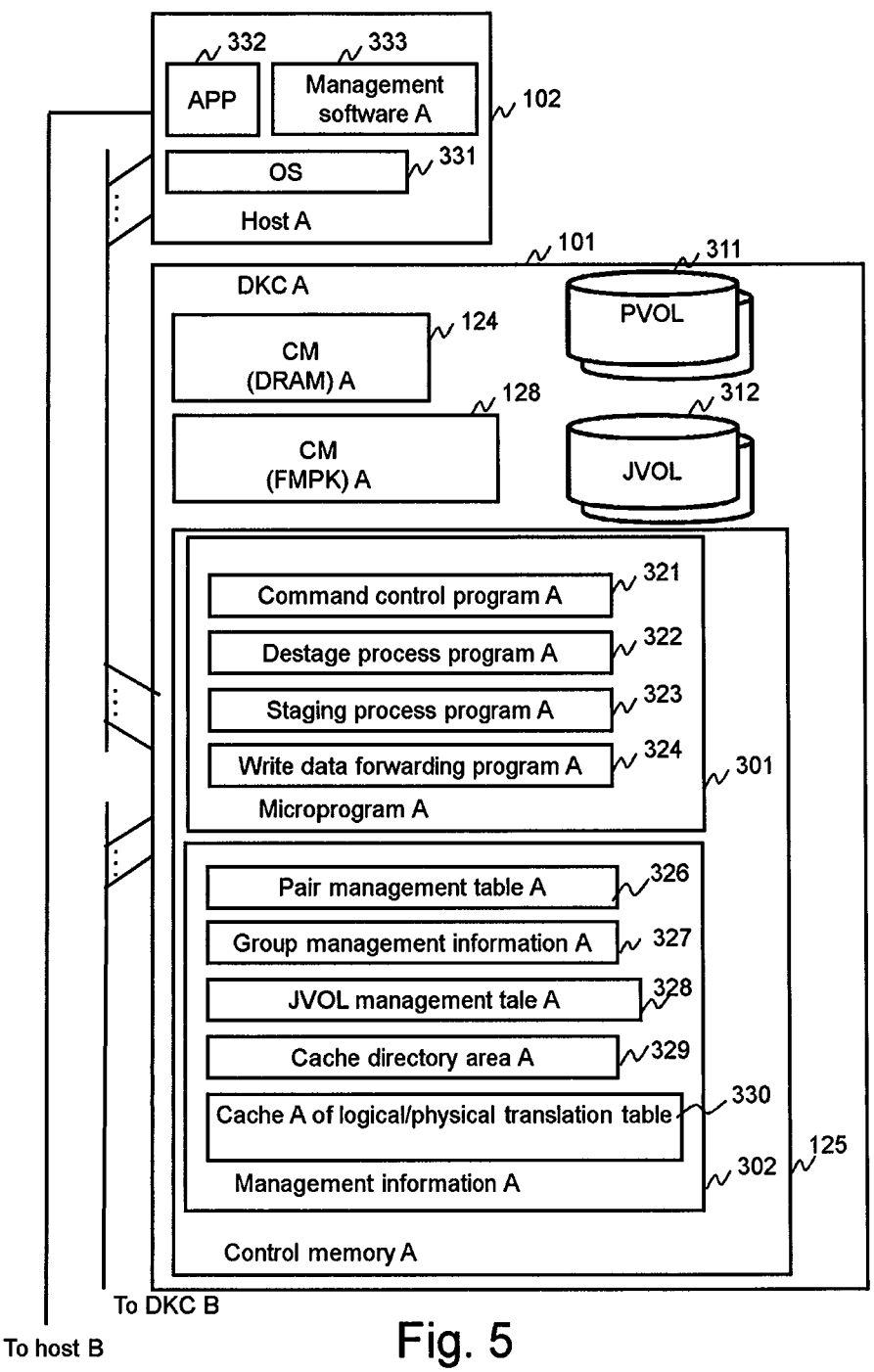
FIG. 5 is a diagram for showing the logical configuration of the DKC A in the embodiment.

FIG. 5 is a diagram for showing the logical configuration of the DKC A 101 in the embodiment.

The CTL 131 of the DKC A 101 provides the host computer A 102 with plural primary logical volumes (hereinafter, PVOLs) 311 formed using the storage area of the storage devices 132. A unique VOL number (VOL#, for example, LUN) is assigned to the PVOL 311 in the DKC A 101. And the host computer A 102 identifies the PVOL 311 by VOL# (LUN (Logical Unit Number)). For example, the OS 331 of each host computer A 102 performs a read access or a write access for the PVOL 311 using VOL#(LUN). The PVOL 311 is composed of an aggregate of logical blocks and block number (block #) is a reference target in case each host computer 102 identifies a block. In the embodiment, this block # may be written as LBA (Logical Block Address) number (#). As for block size, the data size of 512 bytes is used, for example.

The CTL 131 of the DKC A 101 may manage plural JVOLs formed using the storage area of the storage devices 132. In addition, it is not necessary to have JVOL. Moreover, although JVOL is managed, the storage area of the storage devices 132 does not actually need to be assigned.

Next, the configuration of the microprogram A 301 which the CTL 131 of the DKC A 101 performs is shown. The CPU 123 of the DKC A 101 reads and executes each program of the microprogram A 301 stored in the control memory A 125. The microprogram A 301 includes a command control program A 321, a destage process program A 322, a staging process program A 323, and a write data forwarding program A 324. As the CPU 123 executes each program, the detailed explanation as to what kind of operation is carried out is mentioned later.

Furthermore, the control memory A 125 stores management information A 302. Moreover, the management information A 302 includes a pair management table A 326, a group management table A 327, a JVOL management table A 328, a cache directory area A 329, and a cache A 330 of the logical/physical translation table. The management information 326 to 329 may be created with starting of the DKC A 101, and may be created dynamically if needed. Moreover, each field in the management information 325 to 329 may be updated at the change opportunity of the logical configuration of the DKC A 101. The cache A 330 of the logical/physical translation table is information which is caching of the logical/physical translation table originally saved in the FM, in the control memory A. For this reason, when the FMPK 128 mentioned later updates the logical/physical translation table, the CTL 131 refers to the field value of the logical/physical translation table from the FMPK 128, and updates the caching information.

The CM 124 composed of DRAM and the CM 128 composed of FM store the write data received from each host computer 102 and the data which the staging process program 323 in the microprogram 301 has read from the disk 132 temporarily. Other processes are mentioned later.

The host computer A 102 includes an operating system (OS) 331, a management software A 333 of the storage and the application (APP) 332 executed on the OS 331. The APP 332 outputs and inputs data to the DKC A 101 using the input-and-output interface which the OS provides. Moreover, the management software A 333 can, for example, send, to the DKC A 101, instructions to create and delete PVOL 311 and JVOL 312, and send, to DKC A 101, the instruction to configure a remote copy configuration between the PVOL 312 of the DKC A 101 and the secondary logical volume (hereinafter, SVOL) of the DKC B 201. In addition, the management software 333 and APP 332 may be operated on different OSs, respectively. Moreover, the management software A 333 and APP 332 may be operated on different host computers A 102, respectively.

<Logical Configuration of DKC B which is the Secondary Side of the Remote Copy Configuration>

Figure 6:
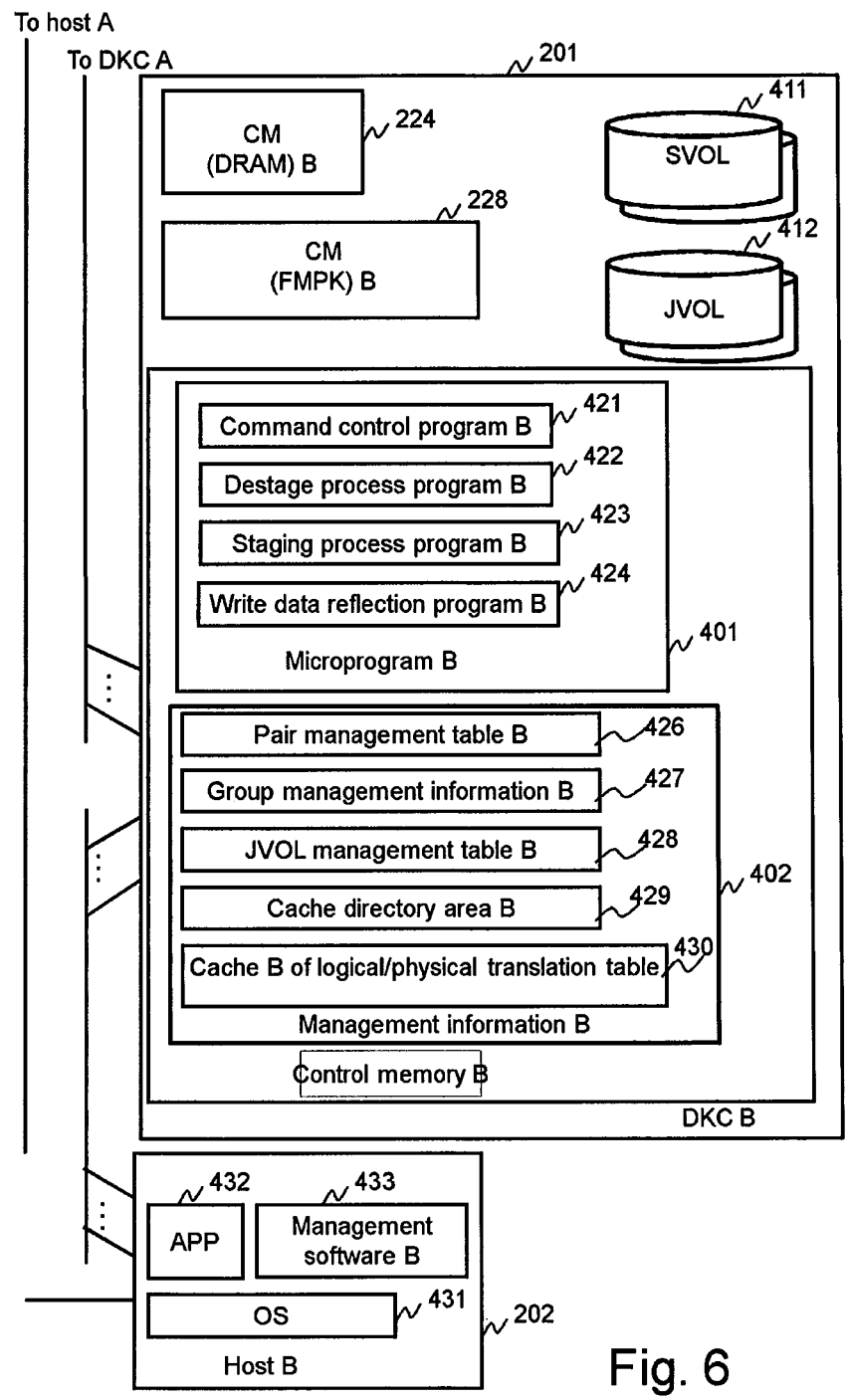
FIG. 6 is a diagram for showing the logical configuration of the DKC B in the embodiment.

FIG. 6 is a diagram for showing the logical configuration of the DKC B 201 in the embodiment.

A CTL 231 of the DKC B 201 provides the host device A 102 with a SVOL 411 formed using the storage area of storage devices 232.

Moreover, the CTL 231 of the DKC B 201 manages a JVOL formed using the storage area of the storage devices 232.

Next, the configuration of the microprogram B 401 which the CTL 231 of the DKC B 201 executes is shown. The CPU 223 of the DKC B 201 reads and executes each program of the microprogram B 401 stored in the control memory B 225. The microprogram B 401 includes a command control program B 421, a destaging process program B 422, a staging process program B 423, and a write data reflection program B 424. As the CPU 223 executes each program, the detailed explanation as to what kind of operation is carried out is mentioned later.

Furthermore, the control memory B 225 stores management information B. Moreover, the management information B 402 includes a pair management table B 426, a group management table B 427, a JVOL management table B 428, a cache directory area B 429, and a cache B 430 of the logical/physical translation table. The management information 426 to 429 may be created with starting of the DKC B 201, and may be created dynamically if needed.

The CM 224 composed of DRAM and the CM (FMPK) 228 composed of FM store the write data received from the host computer B 202 and the data which the staging process program 423 in the microprogram 401 reads temporarily. Other processes are mentioned later.

The host computer B 202 includes an operating system (OS) 431, a management software B 433 of the storage and the application (APP) 432 executed on the OS 431. The APP 432 outputs and inputs data to the DKC B 201 using the input-and-output interface which the OS provides. Moreover, the management software B 433 can, for example, send, to the DKC B 201, instructions to create and delete SVOL 411 and JVOL 412. In addition, the management software B 433 and the APP 432 may be operated on different OSs respectively. Moreover, the management software B 433 and the APP 432 may be operated on different host computers B 202, respectively.

In addition, the DKC B 201 can prohibit writing to the SVOL 411 when the instruction of "Write disable to SVOL" is notified from the management software A 333 in the host computer A 102 or the management software B 433 in the host computer B 202. This is because the consistency of data between the PVOL 311 of the DKC A and the SVOL 411 of the DKC B may be lost if updating data to the SVOL 411 in the DKC B is permitted before the difference data stored in the PVOL from the DKC A has reached the DKC B in the asynchronous remote copy configuration mentioned later.

<Configuration of FMPK>

Figure 7:
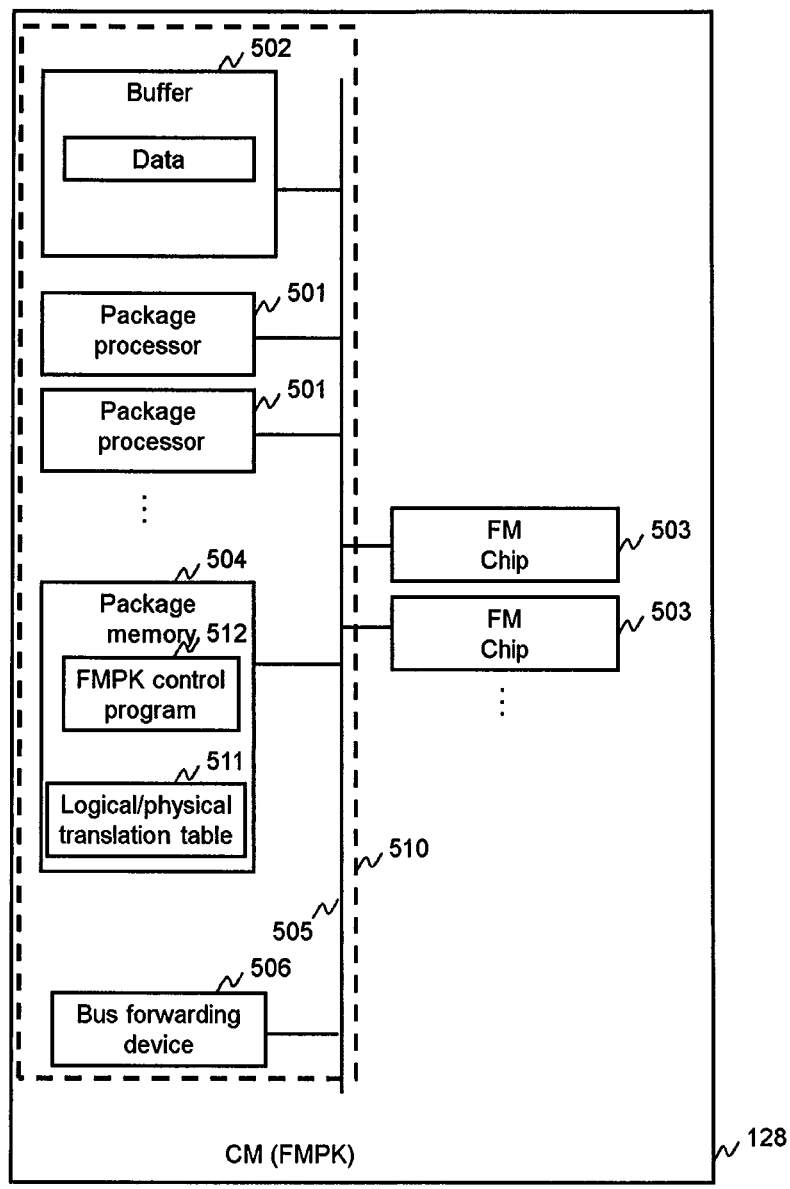
FIG. 7 is a diagram for showing the configuration of a flash package (FMPK) in the embodiment.

FIG. 7 is a diagram for showing the configuration of the FMPK 128 in the embodiment.

The FMPK 128 has a memory controller 510 and plural FM chips 503. The memory controller 510 has a package processor 501, a buffer 502, and a package memory 504. The package processor 501 receives data (write data, JNCB, etc) and performs a process according to the received request. The buffer 502 stores data forwarded between the CPU 123 and the FM chip 503 temporarily. In the embodiment, the buffer 502 is a volatile memory.

The package processor 501 receives data (write data, JNCB, etc), and sends a completion report when it has written the data in the FM chip 503. However, the buffer 502 may be a nonvolatile memory, and the package processor 501 may send a completion report when it has written the data according to the write request from the CPU 123 in the buffer 502.

In addition, when the package processor 501 receives a JNL data creation request from the CPU 123, it sends a completion of the write request to the CPU 123 when it has assigned the physical area in which the write data corresponding to the JNL data is already stored for the logical area for the JNL data in the FMPK.

The control program 512 which the package processor 501 executes, the management information of the FM chip 503, etc are stored in the package memory 504. The management information of the FM chip 503 is, for example, the logical/physical translation table 511 mentioned later. Since the management information of the FM chip 503 is important information, at the time of a scheduled stop, it is desirable that the management information can be evacuated to the specific FM chip 503. Moreover, for a sudden failure, it is desirable to have a battery and be able to evacuate, using this, management information to the specific FM chip 503 even if a failure occurs.

The package bus 505 is a bus through which data is forwarded between the buffer 502 and the FM chip 503 flows, and one or more exist. Although it is common to have plural package buses 505 for the performance improvement, even if there is only one package bus 505, the present invention is valid. The bus forwarding device 506 exists for the package bus 505 correspondence, and performs the data forwarding between the buffer 502 and the FM chip 503 according to the instructions of the package processor 501.

Moreover, the FMPK 228 of the DKC B is the same configuration as shown in FIG. 7.

<CM of DRAM>

Figure 8:
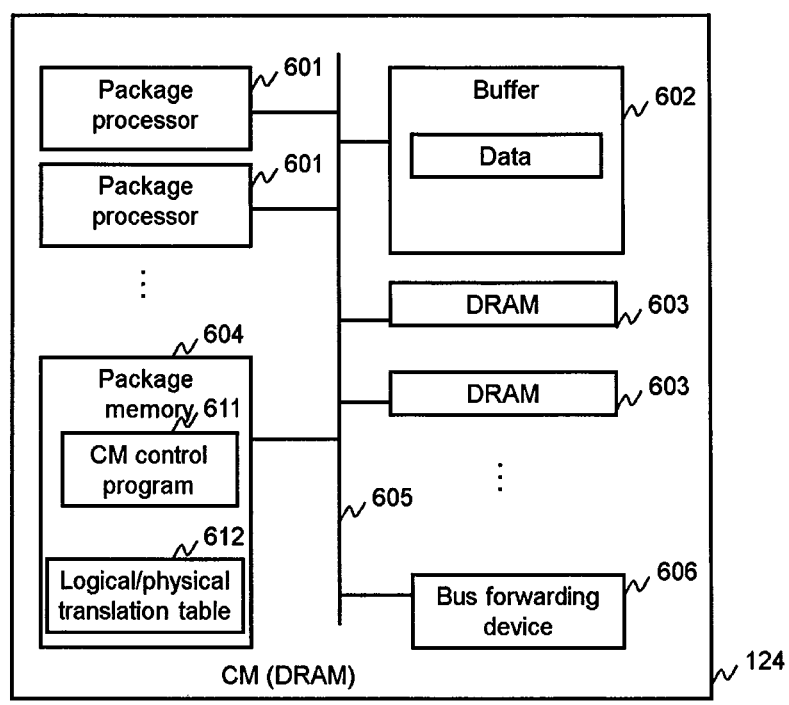
FIG. 8 is a diagram for showing the configuration of the CM composed of the DRAM in the embodiment.

FIG. 8 is a diagram for showing the configuration of the CM 124 composed of DRAM in the embodiment.

The CM 124 has a package processor 601, a buffer 602, plural DRAMs 603, and a package memory 604. The package processor 601 receives data (write data, JNCB, etc) and performs a process according to the received request. The buffer 602 stores data forwarded between the CPU 123 and the DRAM 603 temporarily.

The package processor 601 receives data (write data, JNCB, etc), and is completed when it has written the data in the DRAM 603.

The control program 611 and the management information which the package processor 601 executes are stored in the package memory 604. The management information is, for example, the logical/physical translation table 612. In addition, the logical/physical translation table is the management information which is not usually changed at the time of the operation.

The package bus 605 is a bus through which the data forwarded between the buffer 602 and the DRAM 603 flows.

Moreover, the CM 224 which composed of DRAM of the DKC B is the same configuration.

<Cache Directory in the Control Memory>

Figures 9, 10:
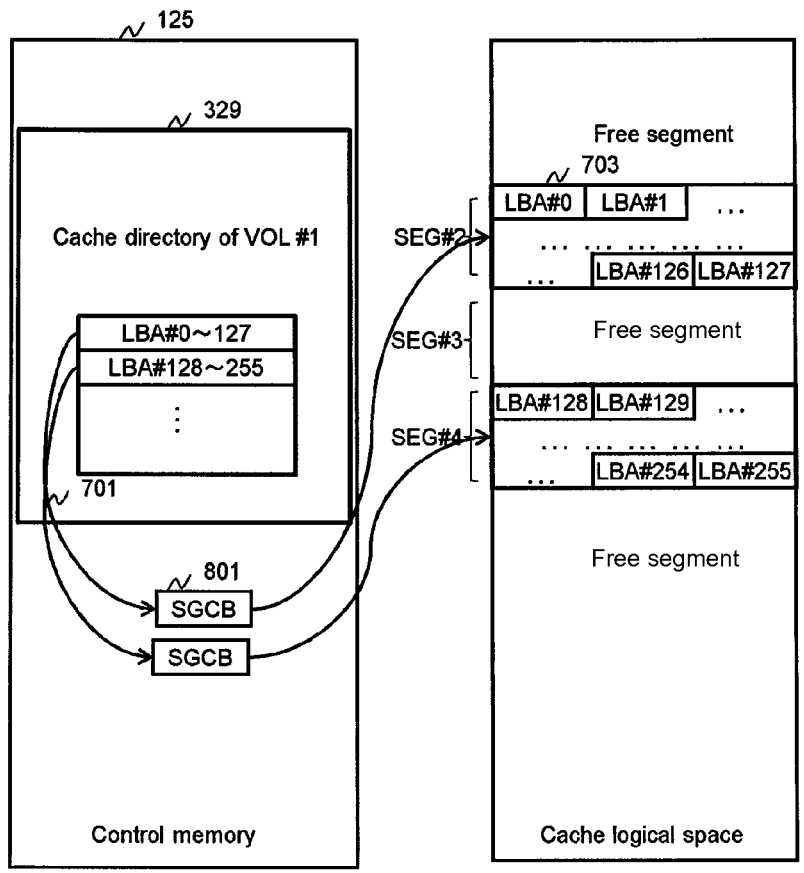
FIG. 9 is a diagram for showing the cache directory stored in a control memory A of the DKC A in the embodiment.
FIG. 10 is a diagram for showing a segment control block (SGCB) in the embodiment.

FIG. 9 is a diagram for showing the cache directory 329 stored in the control memory A 128 of the DKC A 101 in the embodiment.

The cache directory 329 exists for each VOL. For example, the cache directory 329 exists for each PVOL 311 and for each JVOL 312 in the DKC A 101 and for each SVOL 411 and for each JVOL 412 in DKC B 201.

The cache directory 329 manages the pointer 701 to the segment control block (SGCB) 801 for each certain (128 pieces in the embodiment) LBA range. The cache directory 329 indicates that the caching of the data is carried out when the pointer of a certain LBA range in the PVOL 311 is carried out to the SGCB 801, and when the pointer is not carried out, the cache directory 329 indicates that the caching of the data is not carried out. In addition, although the SGCB 801 is explained in detail in FIG. 10, the information which shows which logical area of which CM is pointed at is stored.

When the DKC A 101 receives a read access request to the PVOL 311 from the host computer A 102, the command control program A 321 refers to the cache directory 329, and checks whether the read target data of the PVOL 311 is cached in the CM 124 composed of DRAM or the CM 128 composed of FM.

When the read target data is cached in the CM 124 or 128, the command control program A 321 forwards the data in the CM 124 or the CM 128 to the host computer A 102. When the read target data is not cached in the CM 124 and 128, the command control program A 321 secures a logical space of cache newly, saves (hereinafter, staging) the read target data read from the storage device 132, and forwards the data on the cache to the host computer A 102.

When the DKC A 101 receives a write access request to the PVOL 311 from the host computer A 102, the command control program A 321 checks whether the data of the write access destination is cached in the CM 124 or 128 with reference to the cache directory 329. When the data of the write access destination is not cached in the CM 124 and 128, the command control program A 321 secures a cache logical space newly, and writes the write data there. On the contrary, when the data of the write access destination is cached in the CM 124 or 128, the command control program A 321 writes the write data in the logical area secured already.

The destage process program A 322 mentioned later reflects (hereinafter, destages) data written in the CM 124 or 128 by the host computer A 102, in the storage device 132 synchronously or asynchronously with the write command process. The write data received from the host computer A 102 which is the data stored in the CM 124 or 128, but not reflected in the storage device 132 is called "dirty" as it is in a dirty state. On the other hand, the data reflected in the storage device 132 is called "clean" as it is in a clean state, and it shows that the consistency between the data on the CM 124 or 128 cache and the data on the disk is maintained. As mentioned above, since the latest data written by the host is always in the cache, whether there is any latest data on the cache or not is checked first also on the read command process mentioned above.

The secured unit of the cache logical space is called a segment (SEG), for example, and the size is 64 KB. On the other hand, the unit of the read/write access request for the DKC A 101 from the host computer A 102 is called a block, for example, and the size is 512 B. When the host 102 issues a read or write access request to the VOL 311, it specifies the Logical Block Address Number (LBA#) to specify a storage area.

The cache directory 329, which exists for each PVOL 311 and JVOL 312 in the DKC A 101 and for each SVOL 411 and JVOL 412, indicates whether the data of these volumes is cached in the CM 124 and 128 or not. The cache directory 329 also indicates whether the data is in a "clean" state or "dirty" state. In addition, although the managed values on the cache directory 429 of the DKC B 201 may also differ, it is the same configuration.

<Segment Control Block (SGCB)>

FIG. 10 is a diagram for showing the segment control block (SGCB) 801 in the embodiment.

The SGCB 801 is the control information to manage by dividing the cache logical space. The SGCB 801 is composed of a segment (SEG) number (#) field, a VOL address field, the cache state field, and a dirty bit map field. The SEG# is a number for identifying the logical area in the CM 124 or CM 128 uniquely in the DKC A 101, and the number corresponding to each segment of the cache logical space is stored in each entry of the SEG# field. The data is stored in which logical area of which cache package can be specified from the SEG#. The VOL address is a number for identifying the block in the VOL uniquely, and is stored in each entry of the VOL address field as VOL# and the number (LBA#) corresponding to each block in the VOL. In addition, this address indicates the storage destination in the PVOL of the logical area data on the CM 124 or CM 128. The cache state indicates whether the logical space of the CM 124 or CM 128 denoted by the SEG# stores clean data or dirty data, and the information which the data of the PVOL 311 mentioned above is either in the "clean" state or the "dirty" state on the CM 124 or CM 128 is stored in the cache state field.

In addition, although the managed values on the SGCB which the DKC B 201 manages may also differ, it is the same configuration.

<Relation Between the Logical Space and the Physical Space of FM>

Figure 11:
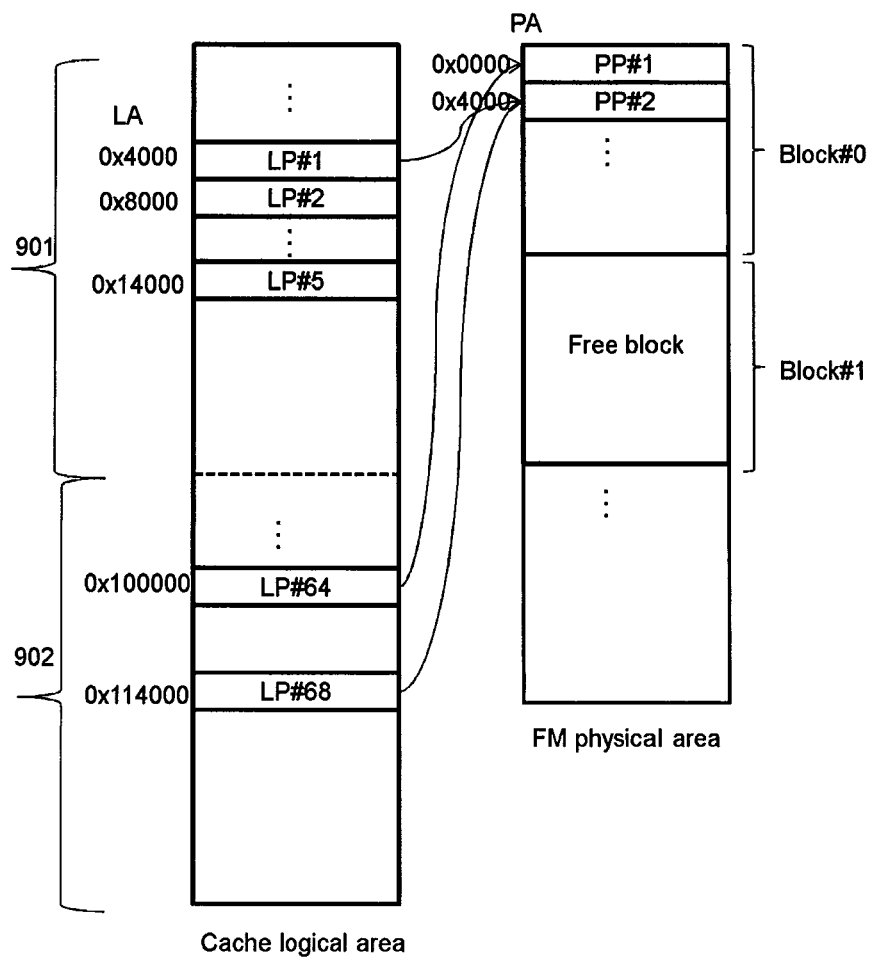
FIG. 11 is a diagram for showing the outline of the relation between the logical space of FMPK, and physical space in the embodiment.

FIG. 11 is a diagram for showing the outline of the relation between the logical space and physical space of the FMPK 128 in the embodiment.

FM is a recordable memory. Accordingly, when the FMPK 128 receives update data, it does not write in the physical area in which the old data has been stored for the characteristic of a memory, but writes in another physical area. For this reason, the FMPK 128 manages the virtual area (logical area) associated with the physical area. Moreover, the flash package 128 divides the physical space into some blocks, divides the blocks into some pages, and assigns them to the logical space. The FMPK 128 stores the logical/physical translation table which manages the correspondence relation between the logical pages (written as "LPs" in the Figure) of the logical area and the physical pages (written as "PP" in the Figure) of the physical page of the physical area assigned to the logical pages, in the package memory 512. The block mentioned here is different from the block of 512 B identified by the LBA# uniquely mentioned above, and is the block identified only in the FMPK uniquely, and for example, the size is 2 MB. Moreover, the sizes of page are 8 KB, 16 KB, etc, for example. On FM, a read/write is performed per page.

In the following embodiment, the physical page assigned to one or more logical page may be called valid physical page, and the physical page which is not assigned to any of the logical pages may be called invalid physical page, and the physical page in which data is not stored may be called free physical page. If the physical page is assigned to one or more logical page, it may be the target of a read request or a write request for the data stored in the physical page. For this reason, data stored in the valid physical page is not an erase target. On the other hand, if the physical page is not assigned to any of the logical pages, the data stored in the physical page is neither read nor written. For this reason, the data stored in the invalid physical page means that it may be erased.

The logical area in the FMPK 128 is composed of the data stored in the PVOL 311, the logical area 901 for the JNCB, and the logical area 902 for the JNL data. In addition, the processor recognizes the logical area 901 (logical area for write data and JNCB) at the beginning, and recognizes the logical area for the JNL data after securing the logical area.

In the JNL data creation process mentioned later, the SGCB belonging to the logical space 902 for the JNL data may be dynamically created in the control memory.

As mentioned later, the logical page (logical page #1) for the write data and the logical page (logical page #68) for the JNL data corresponding to the write data may indicate the same physical page (physical page #2). In addition, only the logical page for the JNL data corresponding to the write data (logical page #64) corresponds to the physical area (physical page #1) which stores the old data, and it does not correspond to the logical page for the write data.

When there is no free physical page in the blocks, the FMPK 128 assigns a free physical page from another block. In this way, when a free physical page is used to store data, the free capacity in the FMPK 128 decreases. The FMPK 128 performs the reclamation process, when the number of the free blocks in the FMPK 128 decreases. Generally, if it is after there is no assignment for the physical page from the logical page (page in 901) used for data storing in the VOL which stores the write data upon performing the reclamation process, the data in the physical page becomes a target to be erased.

However, in the embodiment, the logical page (logical page #1) for the write data and the logical page (logical page #68) for the JNL data corresponding to the write data may indicate the same physical page (physical page #2). Accordingly, when the FMPK 128 in the embodiment has no assignment of a certain physical page for all the physical pages, the FMPK 128 regards the data in the physical page as a target to be erased. Accordingly, even if it is the physical page which stores the old data before update, when the physical page corresponds with the logical page for the JNL data (or when the corresponding logical page for the JNL data is dirty), the FMPK 128 does not regard the data in the physical page as a target to be erased.

In addition, an erase unit in the FMPK is a block unit of FIG. 11. For this reason, when a physical page (valid physical page) having stored the data which is not a target to be erased in a certain block, and a physical page (invalid physical page) having stored the data which is a target to be erased exist, the block is erased after copying the data stored in the valid physical page to the free page of another block. Thereby, a free block can be created and a free capacity can be increased. The details of the reclamation in the FMPK 128 in the embodiment are mentioned later.

As mentioned above, in the embodiment, both the logical page for the write data and the logical page for the JNL data stored in the PVOL are associated with one physical page. For this reason, when the number of the logical page is set below to the number of the physical page, even if the free physical page exists, the logical page associated with the physical page runs short, and the situation of it becoming impossible to use the capacity of the physical area may happen. Therefore, in the embodiment, the FMPK 128 configures the capacity of the logical area of the cache bigger than the capacity of the physical area. Thereby, even if two logical pages are associated with one physical page, it can prevent the logical pages running short and the capacity of the physical area can be used without waste.

Furthermore, in the embodiment, as shown in FIG. 11, the FMPK 128 manages a logical address space in the FMPK by dividing it into a logical area 901 for the write data and for the JCNB, and a logical area 902 for the JNL data.

When the FMPK writes data in different timing for the same logical page, the data is written in the different physical page, as mentioned above. At this time, data read as JNL differ in the timing written even if it is the data which has the write command in the same logical page. In order to identify this, the identifiable SEQ# uniquely in the DKC A 101 is acquired in the timing of writing, and is managed in the JNCB.

<The Logical/Physical Translation Table in FMPK>

FIG. 12 is a diagram for showing the logical/physical translation table which indicates logical/physical address mapping (allocation, relation) in the embodiment.

The logical/physical translation table 512 includes a logical address field 5111 and a physical address field 5112. In the logical address field 5111, the logical address which indicates a cache area for the data stored in the PVOL, and a logical address which indicates a cache logical area for the JNCB and a logical address which indicates a cache logical area for the JNL data are included. Moreover, the above is the relation between the logical space and physical space in case where the cache is composed of FMPK. In addition, in case where the cache is composed of DRAM, the logical space and physical space are in agreement, and are not assigned to one physical page from plural logical pages.

<Remote Copy Pair Management Table>

FIG. 13 shows the remote copy pair management table A 326 in the embodiment.

The remote copy pair management table 326 is information which manages the remote copy pair configuration, when the PVOL 311 in the DKC A 101 and the SVOL 411 in the DKC B 201 are the asynchronous remote copy pair configuration. The remote copy pair management table A 326 includes a pair number field 3261, a DKC# (A) field 3262, a PVOL# field 3263, a DKC# (B) field 3264, a SVOL# field 3265, and a copied address field 3266.

The pair #3261 is the information (number) for identifying uniquely the pair of the VOL which is in the remote copy configuration between the DKC A 101 and the DKC B 201, and the number corresponding to the remote copy pair is stored in each entry of the pair # field 3261. Numbers stored respectively in the DKC# (A) field 3262 and the DKC# (B) field 3264 are the numbers for identifying DKC uniquely, and for example, the product number of the DKC is stored in each entry of the DKC# (A) field 3262 or the DKC# (B) field 3264. The PVOL# and the SVOL#, are respectively the numbers for identifying VOL in the remote copy pair configuration uniquely, and the number which identifies VOL in the DKC A 101 is stored in each entry of the PVOL# field 3263, and the number which identifies VOL in the DKC B 201 is stored in each entry of the SVOL# field 3265.

That is, it indicates that the copied pair of the pair #1 is composed of the PVOL 1 of the DKC A "1" and the SVOL 1 of DKC B "2", and the initial copy which is mentioned later has been completed until the copied address.

In addition, although the pair management table B of the DKC B 201 has a difference in addresses, such as a copied address, it is a pair management table which has the same field.

<Group Management Table>

FIG. 14 is a diagram for showing the group management tables 327 (above) and 427 (below) in the embodiment.

The group management table 327 includes a group# field 3271, a pair group field 3272, a JVOL# field 3273, a latest sequence number (SEQ#) field 3274, a forwarded SEQ# 3275, and a reflected SEQ# 3276.

The pair group 3272 holds the pair number in which all the PVOLs belonging to the group which the group# indicates are included. A number stored in the JVOL# field 3273 indicates the number of the JVOL belonging to the pair in the pair group. A value stored in the latest SEQ# 3274 is a value which indicates the latest SEQ# in the JNL created in the DKC A. A value stored in the forwarded SEQ# 3275 is a value which indicates the latest SEQ# of the JNL data forwarded to the DKC B 201. A value stored in the reflected SEQ# 3276 is a value which indicates the latest SEQ# of the JNL reflected in the SVOL 411 of the DKC B.

The group management table 427 includes a group# field 4271, a pair set field 4272, a JVOL# field 4273, a latest SEQ# 4274, a received SEQ# field 4275, and a reflected SEQ# 4276.

The pair group 4272 holds the pair# in which all the SVOLs belonging to the group which the group# indicates are included. A number stored in the JVOL# field 4273 indicates the number of the JVOL belonging to the pair in the pair group. A value stored in the latest SEQ# field 4274 is a value which shows the latest SEQ# in the JNL created in the DKC A. A value stored in the received SEQ# field 4275 indicates the latest SEQ# of the JNL data received from the DKC A. a value stored in the reflected SEQ# field 4276 is a value which indicates the latest SEQ# of the JNL data reflected in the SVOL in the DKC B 201.

<JVOL Management Table and JVOL Outline>

FIG. 15 is a diagram for showing the JVOL management table 328 in the embodiment.

Figure 16:
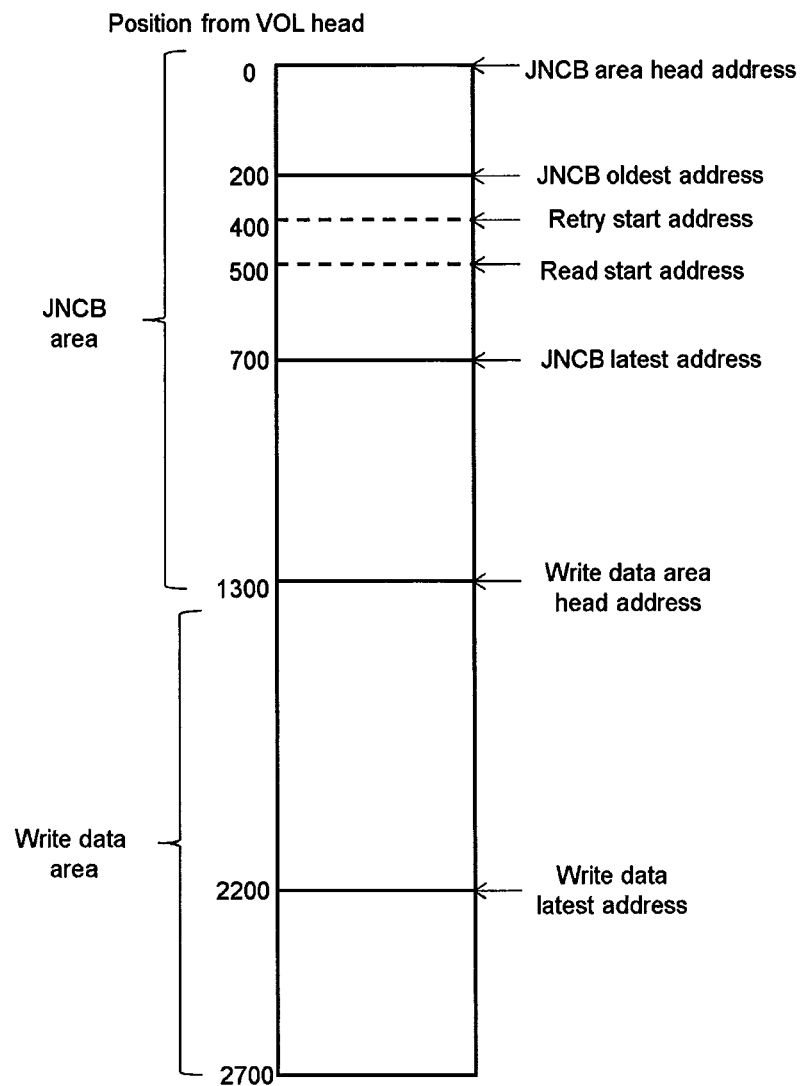
FIG. 16 is a diagram for showing the outline of the storage area of the JVOL in the embodiment.

FIG. 16 is a diagram for showing the outline of the storage area of the JVOL in the embodiment.

In addition, the JVOL management table 328 is unnecessary when the DKC A 101 does not have JVOL.

The JVOL management table 328 includes a JNCB area head address field 3281, a write data area head address field 3282, a JNCB latest address field 3283, a JNCB oldest address field 3284, a write data latest address field 3285, a write data area head address field 3286, a read start address field 3287, and a retry start address field 3288.

The JVOL management table 328 is information which holds for each group and manages the JVOL of the group. The JNCB area head address field 3281 holds the LBA (Logical Block Address) of the head of the storage area (JNCB area) which stores the JNCB of the JVOL. In addition, the details of the JNCB are explained using FIG. 16. The write data area head address field 3282 holds the LBA of the head of the storage area (write data area) which stores the write data of the JVOL. The JNCB latest address field 3283 holds the LBA of the head used for the saving of the JNCB, when it stores the JNL next. The JNCB oldest address field 3284 holds the head LBA which saves the JNCB of the oldest JNL (SEQ# is small). The write data latest address field 3285 holds the LBA of the head used for the saving of the write data, when it stores the JNL next. The write data oldest address field 3286 holds the head LBA which saves the write data of the oldest (SEQ# is small) JNL. The read start address field 3287 and the retry start address field 3288 are used by the read JNL reception process mentioned later.

In the example of the JVOL management table 328, the area (JNCB area) which saves the management information of the JNL is from the position of the head of the storage area of the VOL 4 to 699, and the area (write data area) which saves the write data of the JNL is from the position of 700 of the storage area of the VOL 4 to the position of 2699. The management information of the JNL is saved from the position of 200 of the storage area of the VOL 4 to the position of 499, and the management information of the next JNL is saved from the position of 500 of the storage area of the VOL 4. The write data of the JNL is saved from the position of 1300 of the storage area of the VOL 4 to the position of 2199, and the write data of the next JNL is saved from the position of 2200 of the storage area of the VOL 4.

In the JVOL management table B which the DKC B holds, although the data stored differs, it has the same field configuration. In addition, the JVOL management table B may be a table which does not include the read start address field 3287 and the retry start address field 3288 used for the process of the JNL read request.

The JVOL is divided into the storage area (JNCB area) which stores the JNCB and the storage area (write data area) which stores the write data, for example, as shown in FIG. 16. The JNCB area stores JNCBs from the head of the JNCB area in order of the SEQ# and when a JNCB reaches the termination of the JNCB area, it stores JNCBs from the head of the JNCB area. The write data area stores the write data from the head of write data area, and when write data reaches the termination of the write data area, it stores write data from the head of the write data area. The ratio of the JNCB area and the write data area may be a fixed value, and may be configurable by the maintenance terminal or the host 102. These pieces of information are held in the JVOL management table mentioned later. Although the JVOL is divided into the JNCB area and the write data area, and the JVOL is used in the following explanation, the system which stores the JNL, that is, the JNCB and the write data continuously from the head of the VOL may be adopted.

Although the above-mentioned explanation is a form by which one JVOL is assigned to one group, plural JVOLs may be assigned to one group. For example, two JVOLs from which the storage device used as a base differs are assigned to one group, and a JVOL management table is provided for each JVOL, and the JNL is stored alternately. Thereby, writing the JNL to the storage device 101 can be spread and improvement in performance can be expected. Furthermore, the read performance of the JNL also improves. As another example, two JVOLs are assigned to one group and only one JVOL is usually used. The other JVOL is used when the performance of the JVOL currently used falls. The case where performance falls is, for example a case where the JVOL is composed of plural storage devices (for example, disks), and holds data by the system of the RAID 5, and one of the disks composed is broken.

<Configuration of the Journal Control Block (JNCB)>

Figures 17, 18:
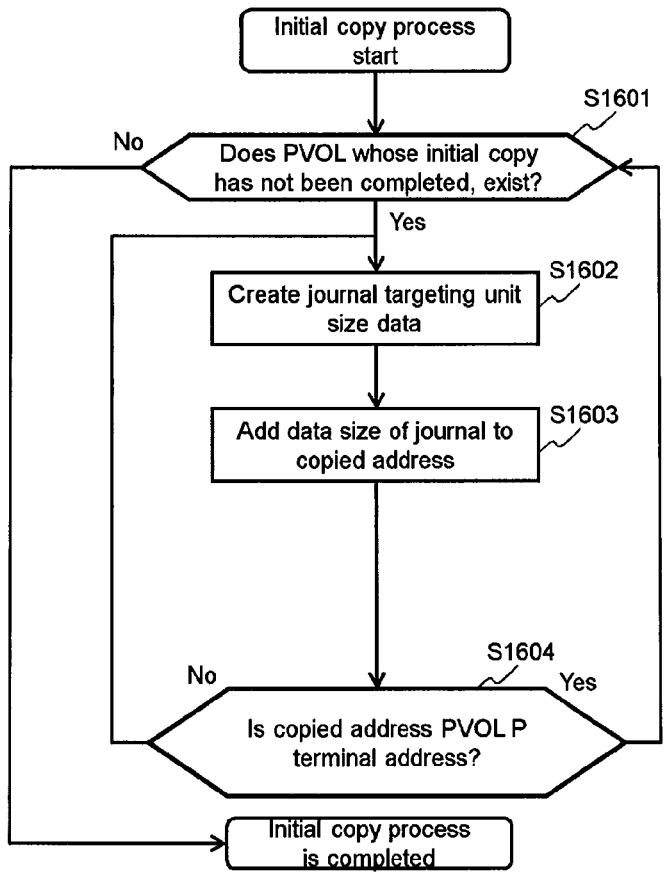
FIG. 17 is a diagram for showing the configuration of the journal control block (JNCB) in the embodiment.
FIG. 18 is a flow chart of an initial copy process between the PVOL and SVOL in the embodiment.

FIG. 17 is a diagram for showing the configuration of the journal control block (JNCB) in the embodiment.

The JNCB 901 is the information for managing the write data, and is composed of the write command receiving time field, the group# field, the SEQ# field of the group management table 503, the logical address field of the write command, the data size field of the write data, and the logical address field of the JVOL which stores the write data. The JNCB may hold only one of the write command receiving time and the SEQ#. When the creation time of the write command exists in the write command from the host 102, the creation time in the write command may be used instead of the time which the write command is received.

The example of the JNCB of the JNL is explained. The JNCB 901 stores the write command received at 22 h: 20 mm: 10 ss on Aug. 14, 2012. The write command is a command which stores the write data in the position of 700 from the head of the storage area of the VOL #1, and the data size is 300. The write data of the JNL is stored in the position of 1500 from the head of the storage area of the VOL #4 (JVOL). The VOL #1 belongs to the group 1 and it is understood that it is the fourth data update from the data duplicate start of the group 1.

Below, the asynchronous remote copy process in the embodiment is explained using a flow chart.

<Initial Copy Process>

FIG. 18 is a diagram for showing the flow chart of the initial copy process between the PVOL 311 and the SVOL 411 in the embodiment.

In the initial copy process, the DKC A 101 creates a JNL for each unit size sequentially from the head area of the PVOL 311 for all the storage areas of the PVOL 311 using the copied address of the pair management table 326. The initial value of the copied address is 0 and the data size of JNL is added to the copied address for every creation of the JNL. About the process when the DKC A 101 receives the write command after the completion of the initial copy, the explanation is added in FIG. 19.

The command control program A 321 determines whether the PVOL 311 which is a pair belonging to the group and whose copied address is not a termination address (the copy is not completed) of the PVOL exists or not (S1601). When the PVOL 311 whose initial copy is not completed exists, it proceeds to the S1602, and when the PVOL 311 whose initial copy is not completed does not exist, the initial copy process is ended.

The command control program A 321 creates a JNL for the data of unit size (for example, 1 MB) (S1602). The JNL creation process is mentioned later.

The command control program A 321 adds the data size of the JNL created to the copied address (S1603).

The command control program A 321 determines whether the copied address has reached the termination address of the PVOL 321 or not (S1604). When the copied address has reached the termination address of the PVOL 321, it proceeds to the S1601, and when the copied address has not reached the termination address of the PVOL 321, it repeats the process of the S1601-S1603.

<JNL Creation Process in the Initial Copy Process>

The JNL creation process in the initial copy process is as follows.

The command control program A 321 investigates whether a JNL can be created or not. Specifically, the command control program A 321 investigates the existence of unused area of the JNCB area, and the existence of unused area of the JNL data area using the JVOL management table A 328.

When the JNL can be created, the command control program A 321 acquires the numerical values (latest SEQ# etc) set to JNCB, and controls them to create JNCB in the CM 124 or 128. The SEQ# is the value which added 1 to the value of the latest SEQ# field of the group management table 327 of the target group, and is acquired. The LBA of the area which stores JNCB is a position of the JNCB latest address of the JVOL management table 328. And the command control program A 321 writes the JNCB to the CM 123 or 128.

Next, the command control program A 321 performs staging of the target data to the logical area for the target data of the PVOL in the CM 124 or 128 from the PVOL 311. At this time, when the CM is the FMPK 128, according to the instructions from the CPU 123, the package processor 501 assigns the physical area in which the staged data is stored, to the logical area for the target data of the PVOL and the logical area for the JNL data corresponding to the target data. On the other hand, in the case where the CM 124 is the CM composed of DRAM, the CPU 123 copies data from the physical area, which is assigned to the logical area for the target data of the PVOL and storing the staged data, to the physical area, which is assigned to the logical area for the JNL data corresponding to the target data.

<JNL Creation Process by the Host Write Command>

Figure 19:
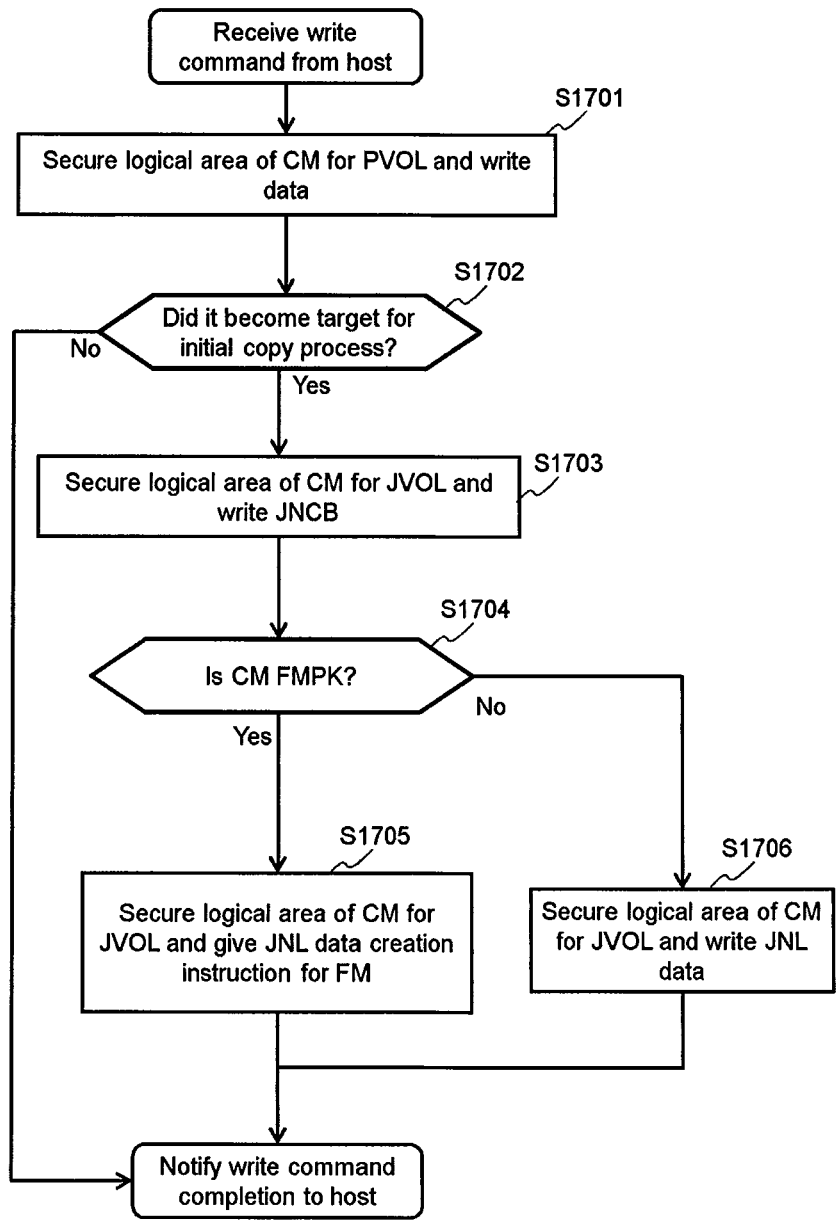
FIG. 19 is a flow chart of a process when the DKC A receives a write command in the embodiment.

FIG. 19 is a diagram for showing the flow chart of the process of the DKC A 101 at the time of receiving the write command to the PVOL 311 from the host computer A 102 in the embodiment.

1) The command control program A 321 secures the logical area of the CM, corresponding to the LBA of the PVOL, and writes the data (S1701).

Specifically, first, the command control program A 321 searches a cache directory using the LBA of the write destination in the PVOL 311, and determines whether the logical area on the CM for storing the write data is secured or not. The command control program A 321 can perform the determination by determining whether the pointer of the SGCB is carried out to the LBA of the write destination of the cache directory of the PVOL 311 or not. If the logical area in the CM 124 or 128 is not secured, the command control program A 321 secures the logical area for the PVOL (write data) of the FMPK 128 by priority, and if there is no securable logical area in the logical area for the PVOL (write data) of the FMPK 128, it secures the logical area for the PVOL (write data) of the CM 124 which is composed of DRAM. The command control program A 321 secures the logical area by the following process, (a) register the write destination VOL number and the write destination LBA in the VOL address of the SGCB 801, change the segment state into "dirty state", and configure the bit corresponding to the offset position of the dirty bit map as "ON";

(b) point at the LBA range including the LBA of the write destination of the cache directory to the SGCB.

The command control program A 321 can secure the SGCB of "free" or "clean" as a logical area.

And the command control program A 321 controls to store the write data in the secured logical area in the CM 124 or 128. When the logical area of the FMPK 128 can be secured, the package processor 501 assigns a free physical area to the logical area, and stores the write data in the assigned physical area. In addition, the package processor 501 updates the logical/physical translation table 512, when assigning a physical area to the secured logical area. And then the processor 123 detects completion of storing the write data A in the FMPK 128, for example, by receiving notification which notifies completion to store the write data A in the FMPK 128. On the other hand, when the logical area of the CM composed of DRAM is secured, the package processor 601 in the CM 124 stores the write data in the physical area corresponding to the logical area.

On the other hand, when the logical area for the PVOL in the CM 124 or 128 is secured, the command control program A 321 controls to store the write data for the logical area which secures the CM 124 or 128. When the CM is FMPK, the package processor 501 of the CM 128 assigns another free physical area to the secured logical area, and stores the write data in the assigned another physical area. In addition, the assignment of the physical area in which the old data is stored and the logical area is released, and is deleted from the entry of the logical/physical translation table 512. Here, when the physical area in which the old data is stored is assigned to another logical area, the assignment to the other logical area is maintained without being released, and is not deleted from the entry of the logical/physical translation table 512, either.

The package processor 501 updates the logical/physical translation table 512 by adding and deleting an entry to the logical/physical translation table 512, at the time of the assignment process and the release process. When the CM is the CM 124 which is composed of DRAM, the package processor in the CM 124 writes the update data over the data in the physical area corresponding to the logical area.

In addition, the command control program A 321 may notify explicitly that "write instructions of PVOL" is performed for the CM 124 or 128 in order to separate from "JNL data creation instructions" mentioned later.

2) The command control program A 321 determines whether the write target LBA of the PVOL has become the process target of the initial copy process (S1702). When it has not become the process target of the initial copy, the process is ended without creating JNL. When it has become the process target of the initial copy process, the JNL creation process is continued.

3) The command control program A 321 acquires the SEQ#, the LBA of the area which stores the JNCB, and the JVOL LBA of the area which stores the write data. And the command control program A secures the logical area for the JNCB on the CM (CM in which write data is stored at S1701), and stores the JNCB. Specifically, when it secures the logical area for the JNCB of the FMPK 128, the package processor 501 of the FMPK 128 assigns a free physical area to the secured logical area, and writes the JNCB in the assigned physical area (S1703). In addition, the package processor 501 adds and updates an entry to the logical/physical translation table 512, when assigning a physical area to the secured logical area. Moreover, when the command control program A 321 secures the logical area for the JVOL of the CM 124 composed of DRAM, the package processor 601 in the CM 124 writes the JNCB in the physical area assigned to the secured logical area.

In addition, the SEQ# is an acquired value by which 1 is added to the value of the latest SEQ# field of the group management table 327 of the target group. The LBA of the JVOL which stores the JNCB is the JNCB latest address of the JVOL management table 328. The JVOL LBA of the area which stores the write data is the write data latest address of the JVOL management table 328. Moreover, the command control program A configures the above-mentioned acquired numerical value and the group number, the time which the write command is received, the LBA in the write command, and the amount of data to the JNCB.

The command control program A 321 secures the logical area 902 for JNL data by securing the SGCB. The SGCB which is pointed by JVOL cache directory manages (indicates) whether the JNL data is "clean" state or "dirty" state.

4) The secured CM which has become the storage destination of the write data by the S1701 determines whether it is the FMPK 128 or the CM 124 composed of DRAM (S1704). If it is the FMPK 128, it proceeds to the S1705. On the contrary, if it is the CM 124 composed of DRAM, it proceeds to the S1706.

5) In the S1705, the command control program A 321 secures the logical area for the JNL data in the FMPK 128. Next, the command control program A 321 sends the logical area for the write data stored the write data is written at the S1701, the logical area for the secured JNL data in the FMPK 128, and the JNL data creation instruction to the FMPK 128.

The package processor 501 of the FMPK 128 assigns the physical area assigned in the logical area for the write data which the write data is written at the S1701, to the logical area for the secured JNL data, and updates the logical/physical translation table 512. Then, the package processor 501 sends "JNL data creation completion notification" to the command control program A. Here, when the physical area is not assigned to the logical area for the write data which the write data is written at the S1701, the package processor 501 sends the command of "JNL data creation failure" to the command control program A 321.

6) In the S1706, the command control program A 321 secures the logical area for the JNL data in the CM 124 composed of DRAM. The command control program A 321 controls to store the copy data of the write data in the secured logical area of the CM 124. The package processor 601 of the CM 124 writes the copy of the write data to the physical area assigned to the secured logical area.

7) The command control program A 321 sends the write completion notification to the host computer A 102 through the host IF, and ends the process (S1707).

In addition, when the assignment from all the logical areas to the physical areas is canceled (when deleted from the logical/physical translation table), the package controller of the FMPK can manage the physical areas as areas of erase target.

As above, in using the FMPK 128 as CM, the package processor 501 of the FMPK 128 assigns the physical area which is assigned to the logical area for the write data stored in the PVOL and in which the write data is stored, in the logical area for the JNL data. Accordingly, aside from the physical area which stores the write data of the PVOL, the CPU 123 secures the physical area which stores the JNL data to the JVOL, and does not need to store the JNL data, and can decrease the load of the CPU 123. Moreover, in the FM, if the amount of data storing increases, the execution frequency of the erase process also increases and the FM deteriorates easily. In the embodiment, storing of the JNL data becomes unnecessary by managing the write data also as the JNL data. Thereby, the amount of data storing decreases and the lifespan of the FM can be extended.

<Destage Process of the JNL Data>

Figure 20:
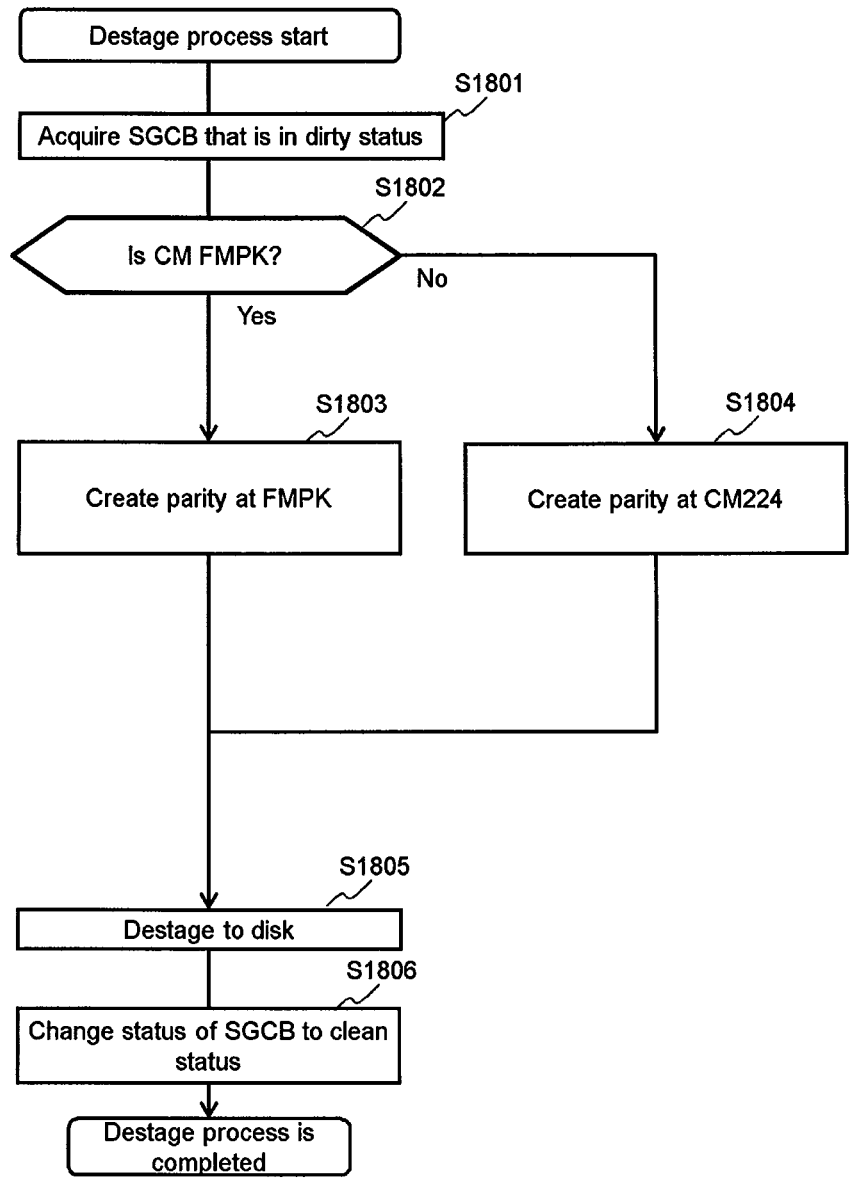
FIG. 20 is a flow chart of a process in which the DKC A destages dirty data on the CM in the embodiment.

FIG. 20 is a flow chart which shows the process after the CTL 131 of the DKC A 101 detects dirty data on the CM 124 or 128 until it performs destage to the storage device 132 in the embodiment.

The destage process program A 322 searches and acquires dirty data (SGCB of a dirty state) (S1801). When there are plural SGCBs of a dirty state, it acquires the oldest used SGC, for example based on the Least Recently Used (LRU). The destage process program A 322 ends the destage process, when there is no SGCB whose cache state is in a "dirty". In addition, when the DKC A 101 is not equipped with the JVOL 311, the destage process program A 322 does not acquire the SGCB which indicates the logical area for the JVOL on the FMPK 128. Moreover, even if the case that the DKC A 101 is equipped with the JVOL 311, when there is a free area on the FMPK 128 and there is area, the destage process program A 322 may not acquire the SGCB which indicates the logical area for the JVOL on the FMPK 128.

The destage process program A 322 confirms the segment number in the acquired SGCB, and it checks whether the CM which has the logical area referred to by the segment number in the SGCB is the FMPK 128 or the CM 124 which is composed of DRAM (S1802).

When it is the CM 124 which is composed of DRAM (in case of No at the S1802), it proceeds to the S1804. The destage process program A 322 performs the securement of the old parity segment and the old data segment on the CM 124, when the RAID level of the storage device is for example, "RAID 5." The destage process program A 322 secures a new parity segment on the CM 124. The destage process program A 322 performs staging of the old parity data to the old parity segment, the old data to the old data segment, and writes the dirty data over the old data. In addition, when the old data is unnecessary upon creating a new parity, the destage process program A 322 may not perform staging of the old data. And the destage process program A 322 creates a new parity with the old parity segment and the old data which has overwritten the dirty data, and writes the new parity in the secured new parity segment (S1804).

When the CM is FMPK (in case of Yes at the S1802), the destage process program A 322 performs the same process as the S1804 to the FMPK (S1803) In addition, the destage process program A 322 may make the FMPK 128 send instructions and perform a reflection of the host write data to the old data segment, a creation of the new parity and the reflection process to the disk, excluding the securement process of the new and old parity segment. By doing this, it is because the destage process program A 322 can omit the process overhead concerning the securement of the new and old parity segment and realize a high performance.

And the destage process program A 322 forwards the data segment and the new parity segment to the storage device 132 (S1805).

The destage process program A 322 configures the cache state of the destaged SGCB from "dirty" to "clean" (S1806).

When the cache state of the segment becomes "clean", the data corresponding to the segment can be canceled. The command control program A 321 specifies the logical address corresponding to the "clean" segment, and sends, to the FMPK 128, "logical page cancellation instructions" to notify the cache logical address of the cancellation target. The package processor 501 of the FMPK 128 deletes the entry corresponding to the received logical address from the logical/physical translation table, when the package processor 501 receives "logical page cancellation instructions". The package processor 501 notifies "logical page cancellation completion response" to the command control program A 321, when deletion of the entry is completed.

It means that the data is canceled as the write data for the PVOL from the FMPK 128 by this. However, as long as the data is referred to as the JNL data, it is necessary to be able to be read as JNL data, and is not the erase target.

In the process (S1801) which searches and acquires the SGCB in the dirty state mentioned above, the destage process program A 322 refers to the VOL address in the SGCB of a dirty state, and can perform the process as follows. However, the SGCB in the dirty state where the VOL address in the SGCB is the VOL address on the PVOL is supposed to be the SGCB (18-1), and the SGCB in the dirty state where the VOL address in the SGCB is the VOL address on the VOL, (that is the segment number in the SGCB belongs to the logical area 902 for the JNL data) is supposed to be the SGCB (18-2).

When the destage process program A 322 refers to the logical/physical translation table of the FMPK 128, and confirms if the cache logical address which points at the physical address corresponding to the cache logical address of the SGCB (18-1) or the SGCB (18-2) exists in others, and if the SGCB (18-3) of the dirty state corresponding to the cache logical address exists, the destage process program A 322 performs the destage process of the dirty data which the SGCB (18-3) points at simultaneously at the time of the destage process performance of the dirty data which the SGCB (18-1) or the SGCB (18-2) points at. By performing destage of the dirty data of the SGCB (18-3) simultaneously at the time of the destage process performance of the SGCB (18-1) or the SGCB (18-2) as mentioned above, the destage process program A 322 can change the dirty data which exists in the area of the logical address of the PVOL and the dirty data which exists in the area of the logical address of the JVOL which refers to the same cache physical address as the logical address of the PVOL refers, into a clean state simultaneously (it can change the physical address into a releasable state). For this reason, the state where the SGCB which points at the PVOL data is in a clean state and the SGCB which points at the JVOL data becomes dirty state is avoided, and the right use capacity of the cache can be sent to the microprogram.

Moreover, in the process (S1801) which searches and acquires the SGCB in the dirty state mentioned above, the destage process program A 322 may perform the process with reference to the VOL address in the SGCB of a dirty state as follows. When the destage process program A 322 confirms that the SGCB (18-1) exists, and the cache logical address which points at the physical address corresponding to the cache logical address of the SGCB (18-1) does not exist in others with reference to the logical/physical translation table, the destage process program A 322 may perform the destage process of the SGCB (18-1) to other dirty data by priority. In case the CM 128 is filled with dirty data, destaging the SGCB (18-1) by priority by the destage process program A 322 allows to destage the dirty data (including the JNL data which is destaged once to the JVOL and staged to the cache logical space 901 again) on the CM 128 other than the dirty data (data of the PVOL and the JVOL) of the cache logical address which refers to the same physical address in first, and secure a free area of the cache.

<Read JNL Command Process>

First, the command control program B 421 of the DKC B 201 investigates whether the JNL data and the JNCB which are acquired from the DKC A 101 are storable in the JVOL 412 of the DKC B 103 or not. When the JNL data and the JNCB are not storable in the JVOL 412, the command control program B 421 ends the process as a read JNL command process failure. When the JNL data and the JNCB are storable in the JVOL 412, the command control program B 421 acquires the SEQ# which 1 is added to the received SEQ# in the control memory 130, and the LBA of the area which stores the JNCB and the LBA of the area which stores the write data. The command control program B 421 sends "read JNL command" to the DKC A 101 by making the forwarded SEQ# into a parameter. That is, the DKC B 201 sends "read JNL command" to read the JNL data and the JNCB which is not sent to the DKC B 201 from the DKC A 101, to the DKC A 101.

Figure 21:
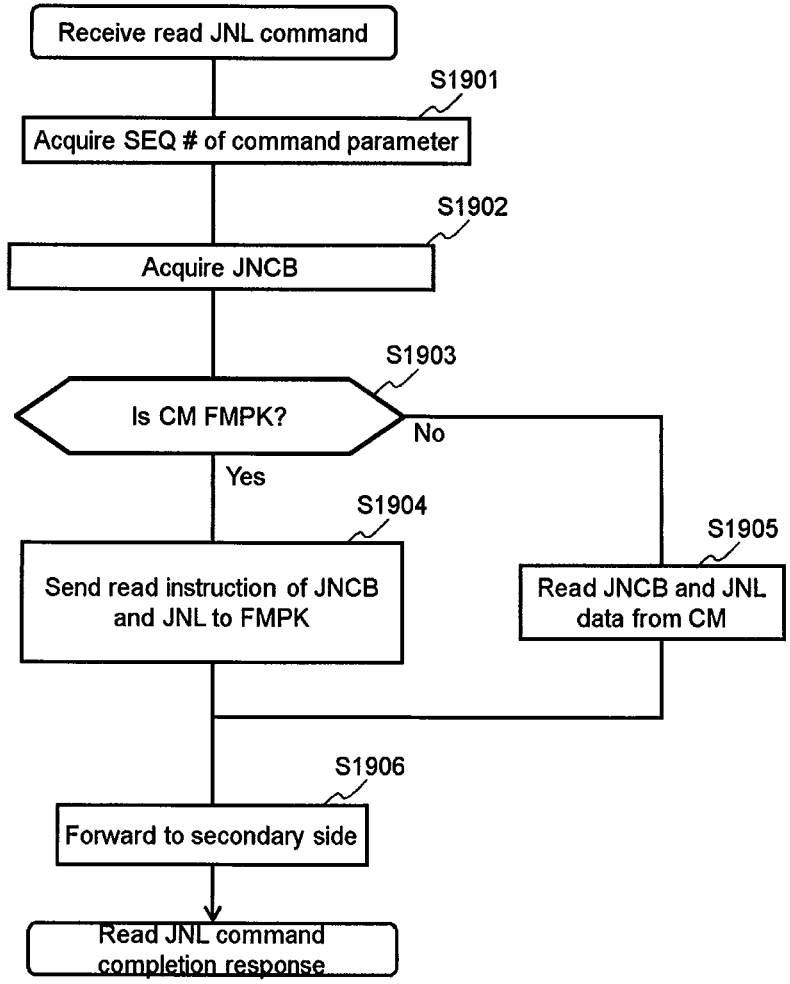
FIG. 21 is a flow chart of a process when DKC A receives a JNL read command in the embodiment.

FIG. 21 is a diagram for showing the flow chart of the process when the DKC A 101 receives the JNL read command from the DKC B 201.

The write data forwarding program A 324 of the DKC A 101 acquires a parameter contained in the read JNL command, when receiving the read JNL command (S1901). The parameter in the read JNL command is the SEQ#, for example.

The write data forwarding program A 324 acquires the JNCB corresponding to the SEQ# based on the SEQ# (S1902).

When staging of the JNL data and the JNCB is not performed to the CM 124 or 128, the staging process program A 323 performs staging to the FMPK 128 by priority.

Next, the write data forwarding program A 324 checks whether the CM in which the JNL data and the JNCB are stored is the FMPK 128 or not (S1903).

When the CM in which the JNL data and the JNCB are stored is the FMPK 128 (when S1903 is Yes) the write data forwarding program A 324 sends "JNL data read instructions", the logical area for the JNL data on the FMPK 128, and the logical area for the JNCB on the FMPK 128, to the FMPK 128 (S1904). When receiving "JNL read instructions", etc, the package processor 501 of the FMPK 128 reads the JNCB and the JNL data based on the logical area for the JNL data on the FMPK 128, the logical area for the JNCB on the FMPK 128, and the logical/physical address translation table, and forwards to the write data forwarding program 324 (or it forwards to the host I/F). At this time, the logical area for the JNL data on the FMPK 128 may be referring to the physical area assigned to the logical area for the write data stored in the PVOL.

When the CM in which the JNL data and the JNCB are stored is the CM 124 composed of DRAM (when S1903 is No), the write data forwarding program A 324 reads the JNCB and the JNL from the CM 124 (S1905).

Then, the write data forwarding program A 324 forwards the JNCB and the JNL data to the DKC B 201 through the host I/F 121 (S1906).

The write data forwarding program A 324 sends the completion response of the read JNL command to the DKC B 201, and ends the process. The command control program B 421 of the DKC B 201 controls to save the JNCB and the JNL data in the JVOL 412 of the DKC B 201, when receiving the JNCB from the DKC A 101 and the completion response of the read JNL command. In addition, the command control program B 421 updates the write command logical address of the JNCB for the number of the SVOL in the DKC B.

The command control program B 421 writes the JNCB in the CM 224 or 228 first. The JNCB written in the CM 224 or 228 may be written in the JVOL asynchronously with the read JNL command process. The LBA of the area which stores the JNCB in the DKC B 201 is the JNCB latest address of the JVOL management table 428 of the DKC B 201.

The command control program B 421 writes the JNL data in the CM 124 or 128 next. Then, the command control program B 421 destages to the JVOL. The LBA of the area which stores the JNL data is the write data latest address of the JVOL management table 428.

<Promote Process of the JNL Data>

Figure 22:
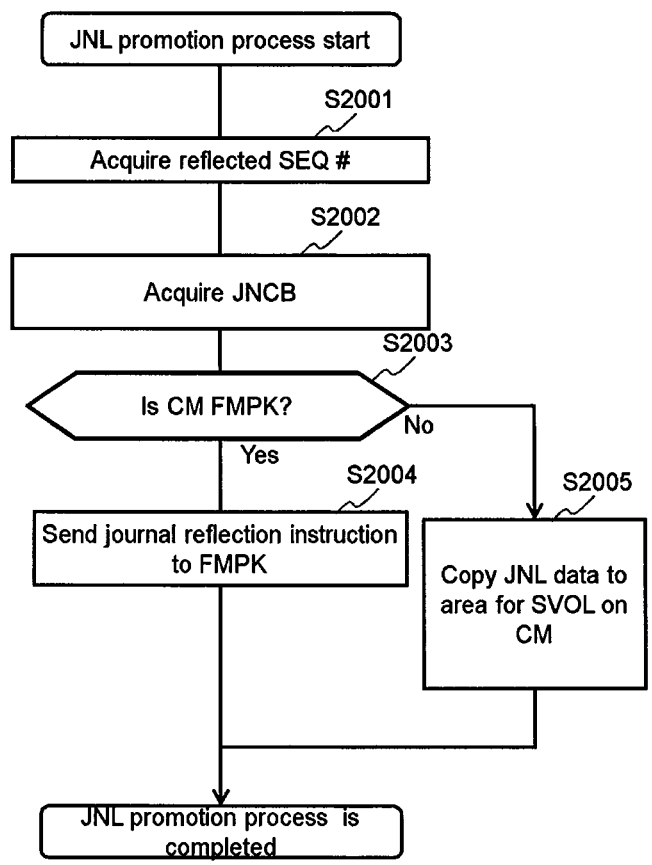
FIG. 22 is a diagram for showing a flow chart of a process in which the DKC B reflects the JNL data stored in the JVOL in the SVOL in the embodiment.

FIG. 22 is a diagram for showing the flow chart of the process which the DKC B 201 reflects the JNL data stored in the JVOL 412, in the SVOL with reference to the JNCB in the embodiment.

The write data reflection program B 424 of the DKC B 201 acquires the reflected SEQ# (S2001).

Moreover, the write data reflection program B 424 confirms whether the JNCB whose value which 1 is added to the reflected SEQ# is stored as the SEQ# and the JNL data corresponding to the JNCB are stored in the CM (224 or 228) or the JVOL 421. Here, when staging of the JNCB is not carried out to the CM (224 or 228), staging of the JVOL 412 to the JNCB is carried out. The CM of the staging destination gives priority to and chooses the FMPK 228. And the write data reflection program B 424 acquires the JNCB from the CM (224 or 228) (S2002). The write data reflection program B 424 interrupts the process, when there is no JNCB in the CM (224 or 228) or the JVOL. The write data reflection program B 424 may perform this process periodically.

The write data reflection program B 424 checks whether the JNCB is cached to the FMPK 228 or not (S2003). When the JNCB is cached to the FMPK 228 (when S2003 is Yes), the write data reflection program B 424 operates as follows.

1) The write data reflection program B 424 acquires the write command logical address, the data size of the write data, and the logical address of the JVOL which stores the write data with reference to the JNCB. The value of the write command logical address field of the JNCB is updated that the VOL# is changed to the SVOL# on the DKC B by the read JNL command process.

2) The write data reflection program B 424 checks whether the caching of the JNL data corresponded to the JNCB and stored in the JVOL is carried out to the FMPK 228, or not. When the caching of the JNL data is not carried out to the FMPK 228, the write data reflection program B 424 carries out the caching of the JNL data to the FMPK 228 by the staging process.

Specifically, when carrying out the caching of the JNL data to the FMPK 228, the write data reflection program B 424 secures a free segment of the logical area for the JNL data of the FMPK 228, and registers the address of the free segment to the entry corresponding to the logical address of the JVOL on the cache directory. Moreover, when saving the JNL data in the logical area on the FMPK, the package processor in the FMPK 228 assigns a free physical page to the logical area, and stores the JNL data in the assigned physical page. Moreover, the package processor updates the logical/physical translation table.

3) When the JNL data corresponded to the JNCB and stored in the JVOL is cached to the FMPK 228 (or if staged by "2"), the write data reflection program B 242 secures the logical area for the write data on the FMPK corresponding to the logical address of the SVOL (write command logical address). And the write data reflection program B 242 notifies "JNL reflection instructions", the logical area for the JNL data on the FMPK, and the logical area on the secured FMPK to the FMPK 228.

4) When receiving "JNL reflection instructions" from the write data reflection program B 424, the package processor of the FMPK 228 investigates whether the entry whose value of the logical address field of the logical/physical translation table is the logical address of the logical area for the JNL data exists or not, based on the logical/physical translation table and the logical area for the JNL data. When the physical address corresponding to the logical address is found in the logical/physical translation table, the package processor creates an entry newly in the logical/physical translation table, and configures the logical address of the logical area for the write data on the secured FMPK to the value of the logical address field of the entry. Moreover, the package processor configures the physical address assigned to the logical address of the logical area for the JNL data, to the physical address field of the physical page assigned to the configured logical area. And the package processor of the FMPK 228 notifies "JNL reflection process completion" to the write data reflection program B.

In the embodiment, in order for the CPU 223 (or the package processor of the FMPK 228) to reflect the JNL data in the SVOL, it is not necessary to copy the JNL data stored in the logical area for the JNL data on the FMPK 228 to the logical area for the data of the SVOL on the FMPK 228. Accordingly, it may be only good for the package processor of the FMPK 228 to update the logical/physical translation table in order to assign the physical area in which the JNL data is stored, in the logical area on the FMPK corresponding to the logical address of the SVOL, and the data copy in the FM package becomes unnecessary, and it has an effect to be able to reduce the load of the CPU 223, etc.

When the caching of the JNCB is carried out to the CM 224 which is composed of DRAM (when S2003 is NO), the write data reflection program B 424 operates as follows.

When the caching of the JNL data is not carried out to the CM 224, the write data reflection program B 424 stages to the logical area for the JNL data on the CM 224 from the storage device 223. Then, the write data reflection program B 424 copies the JNL data stored in the logical area for the JNL data on the CM 224 to the physical area assigned to the logical area on the CM 224 corresponding to the logical address of the SVOL (write command logical address) (S2005).

In addition, after this, the destage process program B 422 reflects the data stored in the logical area for the data stored in the SVOL on the FMPK 228 or the CM 224, in the SVOL 412 by the destage process.

When the size of the JNL data exceeds the page size which is the capacity management unit of the FMPK 228 on "JNL reflection instructions" mentioned above, the write data reflection program B may calculate the number of the physical pages to secure, and notify "JNL reflection instructions" separately only for the number of times to the FMPK 228. In "JNL promote process" mentioned above, the write data reflection program B 424 repeats the process until the reflected SEQ# corresponds with the received sequence.

<Cancellation of the JNCB and the JNL Data on the DKC B>

The write data reflection program B 424 may delete the JNCB below the reflected SEQ# and the JNL data corresponding to the JNCB from the JVOL. In this case, when the above-mentioned JNCB and the JNL data are cached by the CM, the write data reflection program B 424 also cancels the entry corresponding to these logical addresses.

Moreover, the write data reflection program B 424 notifies "logical page cancellation instructions" and the cache logical address to the FMPK 228 when the CM is the FMPK 228. When the FMPK 228 receives "logical page cancellation instructions", the package processor checks whether the entry corresponding to the cache logical address exists or not based on the logical/physical translation table and the cache logical address. The package processor of the FMPK 228 deletes the entry, when the entry corresponding to the cache logical address exists. The package processor 501 notifies "logical page cancellation completion response" to the write data reflection program B 424, when deletion of the entry is completed. When the entry does not exist, it does not do anything, and notifies "logical page cancellation completion response" to the write data reflection program B 424.

When the CM is the CM which is composed of DRAM, the write data reflection program B 424 may delete the address of the segment from the entry corresponding to the logical address of the JNCB and the JNL data on the above-mentioned cache directory, and regard that the JNCB and the JNL data are cancelled when it couples to the free cue as a free segment.

<Cancellation of the JNCB and the JNL Data on the DKC A 101>

The DKC A 101 holds the JNL data and the JNCB until the promotion of the JNL data on the DKC B 201 is completed. In fact, the DKC A 101 receives the SEQ# (reflected SEQ#) of the JNL data promoted from the DKC B 201, and cancels the JNL data and the JNCB to the point of the received reflected SEQ#.

After the promotion of the JNL data on the DKC B 102 is completed, the command control program B 421 of the DKC B 102 adds the SEQ# of the JNL data to the JNL read request as a reflected SEQ# to the DKC A, and notifies reflected SEQ# by forwarding the JNL read request to the DKC A. The command control program A 321 of the DKC A 101 acquires the reflected SEQ# added to the JNL read request, when receiving the JNL read request.

The command control program A 321 acquires the JNCB corresponding to the reflected SEQ# based on the reflected SEQ# (or the SEQ# which is to the point of the reflected SEQ# and is the SEQ# of the JNL which is not canceled). The command control program A 321 specifies the logical address on the FMPK 128 in which the JNL data is stored, and the logical address on the FMPK 128 in which the JNCB is stored based on the acquired JNCB. Next, the command control program A 321 sends "logical page cancellation instructions" and two specified logical addresses to the FMPK 128.

The package processor 501 of the FMPK 128 deletes the entry corresponding to the received logical address from the logical/physical translation table, when receiving "logical page cancellation instructions". The package processor 501 notifies "logical page cancellation completion response" to the command control program A 321, when the deletion of the entry is completed.

It means that the JNL data and the JNCB whose promotion is completed on the DKC B 201, are canceled on the FMPK 128 of the DKC A 101 by this. In fact, the JNL data stored in the FM and the JNCB are erased by the reclamation process explained below. However, when the data is referred to as the write data for the PVOL, they cannot be erased. The JNCB may be an erase target, as long as the cancellation of the corresponding logical page is completed.

Thus, the logical page corresponding to the physical page which stores the JNL data on the DKC A is held until the promote process in the DKC B 201 is completed. Even if the destage of the write data to the PVOL is completed, the data is held as the JNL data. Thereby, even if it is a case where a fault occurs before the completion of the asynchronous remote copy, the process can be resumed, and the JNL data can be read and the reliability is maintained.

<Reclamation Process of the FMPK>

In order to reuse the physical page used once, it is necessary for the FMPK to erase the whole block including the physical page, and make all pages included in the block the free physical pages. The physical page is in use means that the entry of the logical page which points at the physical page exists in the logical/physical translation table. Moreover, the used physical page means that the entry which points at the physical page once existed in the logical/physical translation, and by "logical page cancellation process" mentioned above or the write process to the same cache logical address, it is the physical page in the state where the entry which points at the physical page does not exist in the logical/physical translation table. When another physical page in the block is still in use, the physical page in use in the block is copied to the physical page of other blocks, and the value of the physical address field is updated to the physical address of the destination physical page for the entry of the physical page of the logical/physical translation table. When all the pages in the block become the used physical pages, the block is erased and is changed into a reusable state. This is called the reclamation process. The reclamation process may be performed asynchronously with "logical page cancellation instruction", and the reclamation process may be performed by "logical page cancellation instruction".

As mentioned above, although the embodiment of the present invention is described, the present invention is not limited to each embodiment, and it can be changed variously in the range which the summary is not deviated.

REFERENCE SIGNS LIST

101 DKC A
102 Host computer A
131 CTL
132 Storage device
201 DKC B
202 Host computer B
231 CTL
232 Storage device

The invention claimed is:

1. A storage system comprising:
a first storage apparatus including a first processor, at least one first memory device providing a storage area for a primary logical volume, and a first flash package which has a plurality of first flash memory chips and a first package processor and temporarily stores write data to be written to the primary logical volume; and
a second storage apparatus including a second processor, and at least one second memory device providing a storage area for a secondary logical volume, and receiving journal data corresponding to the write data of the primary logical volume and update information, and reflecting the journal data to the secondary logical volume according to the update information;
wherein when the first storage apparatus receives a first write command which requests to write a first write data to the primary logical volume,
the first package processor in the first flash package receives the first write data transferred by control of the first processor, allocates a first physical area in the first flash memory chips to a first cache logical area managed by the first flash package, and writes the first write data to the allocated first physical area, and
wherein, when the first package processor in the first flash package receives a first journal data creation request corresponding to the first write data from the first processor, the first package processor allocates the first physical area which stores the first write data to a second cache logical area for first journal data corresponding to the first write data managed by the first flash package,
wherein the first processor creates first update information, which includes a first sequential number indicating a write order of the first write data, and sends the first update information to the first flash package,
wherein the first package processor allocates a second physical area in the first flash memory chips to a third cache logical area for update information managed by the first flash package, and stores the first update information to the allocated second physical area,
wherein when the first storage apparatus receives a second write command which requests to update the first write data after the first package processor receives the first journal data creation request,
the first package processor in the first flash package receives the update to the first write data transferred by control of the first processor, releases the allocation of the first physical area to the first cache logical area, allocates a third physical area in the first flash memory chips to the first cache logical area managed by the first flash package, and writes the update to the first write data to the allocated third physical area, and
wherein the first, second and third cache logical areas are each different cache logical areas managed by the first flash package, and the first, second and third physical areas are each different physical areas in the first flash memory chips.

2. The storage system according to claim 1,
wherein the first processor sends the first journal data creation request, which includes information of the first cache logical area and information of the second cache logical area, to the first flash package, and
wherein the first package processor allocates the first physical area, which is allocated to the first cache logical area, to the second cache logical area by referring to the information of the first cache logical area and the information of the second cache logical area included in the first journal data creation request.

3. The storage system according to claim 2,
wherein the first package processor sends a completion report for the first journal data creation request after allocating the first physical area to the second cache logical area for the first journal data, and
wherein the first processor sends a write completion notification to the write command after detecting completion of storing the first write data to the first flash package and receiving the completion report from the first flash package.

4. The storage system according to claim 1,
wherein, when the first storage apparatus receives a read journal command from the second storage apparatus, the first processor reads the first update information and the first journal data from the first flash package according to the first sequential number included in the read journal command, and sends the first update information and the first journal data to the second storage apparatus by referring to the second and third cache logical areas.

5. The storage system according to claim 4,
wherein the second storage apparatus further includes a second flash package which has a plurality of second flash memory chips and a second package processor and temporarily stores data to be written to the secondary logical volume,
wherein the second package processor in the second flash package allocates a first physical area, to store the first journal data, in the second flash memory chips to a second cache logical area for the first journal data managed by the second flash package, and
wherein, when the second package processor in the second flash package reflects the first journal data to the secondary logical volume, the second package processor allocates the first physical area of the second flash memory chips to a first cache logical area for the first write data managed by the second flash package.

6. The storage system according to claim 5,
wherein, in the second storage apparatus, the second processor destages the first journal data stored in the first physical area, which is allocated to the first cache logical area for the first write data, to the secondary logical volume.

7. The storage system according to claim 6,
wherein the first storage apparatus manages a primary journal logical volume provided by the at least one first memory device,
wherein the first package processor releases the allocation of the first physical area to the first cache logical area, after the first processor destages the first write data from the first cache logical area to the primary logical volume or after the first package processor writes the update to the first write data to the first cache logical area,
wherein the first package processor releases the allocation of the first physical area to the second cache logical area, after the first processor destages the first journal data from the second cache logical area to the primary journal logical volume, and
wherein the first package processor manages the first physical area, from which allocation to the first cache logical area and the second cache logical area is released, as a physical area to be reclaimed.

8. The storage system according to claim 6,
wherein the first package processor releases the allocation of the first physical area to the first cache logical area, after the first processor destages the first write data from the first cache logical area to the primary logical volume or after the first package processor writes the update to the first write data to the first cache logical area, wherein the first package processor releases the allocation of the first physical area to the second cache logical area, after receiving the first sequential number of the first journal data which is reflected on the secondary logical volume from the second storage apparatus, and wherein the first package processor manages the first physical area, from which allocation to the first cache logical area and the second cache logical area is released, as a physical area to be reclaimed.

9. A control method for a storage apparatus including a processor, a plurality of memory devices, and a cache package having a plurality of flash memory chips and a package processor, the control method comprising:

providing a primary logical volume with the plurality of memory devices;

receiving a first write command which requests to write a write data to the primary logical volume;

allocating, by the package processor, a first physical area in the flash memory chips to a first cache logical area managed by the cache package;

storing the write data in the allocated first physical area;

sending, by the processor, a creation command for journal data corresponding to the write data to the cache package;

allocating, by the package processor, the first physical area, in which the write data is stored, to a second cache logical area for the journal data managed by the cache package;

allocating, by the package processor, a second physical area in the flash memory chips to a third cache logical area managed by the cache package;

storing first update information, including a first sequential number indicating a write order of the first write data, in the second physical area;

receiving a second write command which requests to update the first write data after sending the creation command;

releasing, by the package processor, the allocation of the first physical area to the first cache logical area;

allocating, by the package processor, a third physical area in the flash memory chips to the first cache logical area;

storing the update to the first write data to the allocated third physical area; and sending the journal data to another storage apparatus by referring to the first cache logical area, wherein the first, second and third cache logical areas are each different cache logical areas managed by the cache package, and the first, second and third physical areas are each different physical areas in the flash memory chips.

10. The storage system according to claim 1, wherein the second cache logical area managed by the first flash package corresponds to the first physical area in the first flash memory chips to which the first write data is written.

11. The storage system according to claim 1, wherein the first physical area is allocated to both the first cache logical area and the second cache logical area prior to receiving the second write command.

12. The control method according to claim 9, wherein the second cache logical area managed by the cache package corresponds to the first physical area in the flash memory chips to which the first write data is written.

13. The control method according to claim 9, wherein the first physical area is allocated to both the first cache logical area and the second cache logical area prior to receiving the second write command.

* * * * *